(12) United States Patent
Ishibashi et al.

(10) Patent No.: US 7,420,889 B2
(45) Date of Patent: Sep. 2, 2008

(54) OPTICAL DISC TRACKING CONTROL DEVICE, TRACKING CONTROL METHOD, AND TRACKING CONTROL PROGRAM

(75) Inventors: Kenzo Ishibashi, Moriguchi (JP); Eiji Ueda, Yawata (JP); Masahiro Birukawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 39 days.

(21) Appl. No.: 10/528,795

(22) PCT Filed: Oct. 8, 2003

(86) PCT No.: PCT/JP03/12869

§ 371 (c)(1),
(2), (4) Date: Mar. 23, 2005

(87) PCT Pub. No.: WO2004/034388

PCT Pub. Date: Apr. 22, 2004

(65) Prior Publication Data

US 2006/0044962 A1 Mar. 2, 2006

(30) Foreign Application Priority Data

Oct. 10, 2002 (JP) .............................. 2002-297292

(51) Int. Cl.
*G11B 7/00* (2006.01)
(52) U.S. Cl. ................................. 369/44.13; 369/44.26
(58) Field of Classification Search ............... 369/44.28, 369/30.16, 30.17, 30.13, 53.14, 44.13, 44.26
See application file for complete search history.

(56) References Cited

U.S. PATENT DOCUMENTS

| 4,544,872 | A | * | 10/1985 | Hirano et al. | ................ 318/632 |
| 4,866,687 | A | * | 9/1989 | Kasai et al. | ............. 369/30.15 |
| 5,311,490 | A | * | 5/1994 | Matoba et al. | ........... 369/44.28 |
| 5,532,988 | A | * | 7/1996 | Yokogama | ................ 369/44.28 |
| 5,566,141 | A | * | 10/1996 | Yamaguchi et al. | ...... 369/30.17 |

(Continued)

FOREIGN PATENT DOCUMENTS

| JP | 06-301988 A | 10/1994 |
| JP | 2000-3525 | 1/2000 |
| JP | 2001-202635 A | 7/2001 |
| JP | 2002-298346 A | 10/2002 |

*Primary Examiner*—Wayne Young
*Assistant Examiner*—LaTanya Bibbins

(57) ABSTRACT

A tracking control apparatus for stable tracking lead-in of an optical disc which has wobble grooves as tracks, including: a signal detection unit that detects tracking error and wobble signals from an optical spot; a speed detection unit that calculates a relative moving speed between the optical spot and the tracks; a polarity judgment unit that judges that the optical spot is on a land if a wobble signal amplitude value is equal to or lower than a predetermined value in the vicinity of a zero-cross point; a moving direction judgment unit that, when the relative moving speed is within a predetermined range and the optical spot is on a land, judges a moving direction of the optical spot from a rise/decay direction of the tracking error signal; and a control unit that performs a tracking lead-in by reducing the moving speed, based on the moving speed and moving direction.

10 Claims, 11 Drawing Sheets

U.S. PATENT DOCUMENTS

| | | | |
|---|---|---|---|
| 5,587,986 A * | 12/1996 | Funamoto | 369/53.28 |
| 6,097,695 A * | 8/2000 | Kobayashi | 369/275.4 |
| 6,198,718 B1 * | 3/2001 | Watanabe et al. | 720/738 |
| 6,388,963 B1 | 5/2002 | Tanaka | 369/44.26 |
| 7,023,777 B2 * | 4/2006 | Miyazaki et al. | 369/53.13 |
| 2003/0053385 A1 * | 3/2003 | Tobita et al. | 369/47.22 |

* cited by examiner

OPTICAL DISC TRACKING CONTROL DEVICE, TRACKING CONTROL METHOD, AND TRACKING CONTROL PROGRAM

TECHNICAL FIELD

The present invention relates to tracking control apparatus and method for use in an optical disc apparatus for recording and reproducing information on an optical disc in which the track has a wobble groove, more specifically relates to a technology for enabling the tracking lead-in to be performed stably and accurately during an activation of the optical disc apparatus or a seek by judging the tracking polarity from the wobble signal amplitude and by detecting the moving direction being relative between the optical spot and tracks even if an access is to be gained to an area in which no information has been recorded and even if there is no reflectance ratio difference between grooves and lands.

BACKGROUND ART

Conventionally, to improve the efficiency in formatting an optical disc, the wobble groove containing clock information and address information has been used. The optical disc according to this technology has an information track on which data is to be recorded, the information track being formed by causing the grooves formed on the optical disc to wobble using a signal that is generated by modifying the rotation control clock by the address information. The technology provides an advantageous effect of increasing the ratio of recording user data with the same recording density since it enables data to be recorded on the entire track without forming an address area. As this technology, the ATIP method for CD-R and the ADIP method for MD are known, for example. The wobble signal can be extracted from the push-pull signal in the tracking-on state. The band of the wobble signal is set to be lower than the band of data modulation signal so as not to affect the data, and is set to be higher than the band of tracking control so as not to affect the tracking.

Meanwhile, it is a major challenge in designing an optical disc apparatus to speed up and stabilize the activation of the optical disc apparatus and the seek, and stabilization of the tracking lead-in during the activation or seek is crucial to overcoming of the challenge. For the stabilization of the tracking lead-in, judgment of the tracking polarity and detection of the moving direction of the optical spot relative to tracks are important. A conventional method for achieving this in ROM discs is to use data envelope on the track. However, this method does not function in recordable optical discs (including a write-once-read-many type and a rewritable type) since they have a non-recording area (that is to say, an area in which no information has been recorded). Japanese Laid-Open Patent Application No. 6-301988 discloses the first method applicable to recordable optical discs, the first method using the reflectance ratio difference between grooves and lands (areas between grooves). With this method, it is possible to intentionally design and form grooves having a reflectance ratio difference by shifting the ratio of land to groove (L/G ratio) from "1".

In recent development of optical discs using the blue-violet laser, not only the use of wobble grooves but a narrower track pitch is required for achieving higher density. This requirement makes it difficult to secure the reflectance ratio difference between lands and grooves because there is no other choice but to set the L/G ratio to close to "1" since priority is given to securing the formability of optical disc substrate, the wobble signal, the tracking error signal (hereinafter also referred to as TE signal), the recording/reproduction property and the like. Japanese Laid-Open Patent Application No. 2000-3525 discloses the second technology designed to overcome the above problem of the first technology. The second technology is a three-beam system in which two push-pull signals are obtained respectively from two sub-beams, which are shifted from a main beam outward and inward by ¼ track respectively, and a cross track signal is obtained based on a differential between the two push-pull signals, and the obtained cross track signal is used in judgment of the tracking polarity and detection of the optical spot moving direction. This proposal overcomes a problem of a conventional DPP (Differential Push-pull) of being unable to judge the tracking polarity, the problem occurring because the two sub-beams are respectively shifted from the main beam in different directions by ½ track pitch.

Also, Japanese Laid-Open Patent Application No. 2001-202635 discloses the third technology for optical disc tracking control apparatuses for optical discs with wobble grooves. This technology proposes to use a moving direction, which is detected by generating the cross tracking signal on the assumption that "there is, without fail, a difference between lands and grooves in the wobble signal amplitude" in the tracking-off state.

The three-beam system as in the second technology, however, requires a larger laser emission power than the one-beam system. Therefore, for mobile uses that require a small head for the purpose of restricting the power consumption and amount of heat, the one-beam system is suited. If the three-beam system is to be used, a conventional DPP is preferable because it has an advantageous effect of canceling the tracking offset when the data is recorded into the non-recording area.

Also, the assumption that "there is, without fail, a difference between lands and grooves in the wobble signal amplitude" on which the third technology is based cannot be used as a basis for CLV-type optical discs in which the wobble length is basically constant. Similarly, the assumption cannot be used as a basis for DVD-R, DVD+R, DVD-RW, and DVD+RW. This is because in these types of optical discs, the wobble grooves are in a spiral that starts with the inner circumference. The track length per rotation becomes longer as the track is closer to the outer circumference, and the wobble phase is delayed as much if the wobble length is constant. It is considered that in general, the wobble signal amplitude of a land is determined by how wobble signals of two grooves sandwiching the land overlap each other. If the wobble phase is delayed as stated above, the wobble phases of the wobble signals of two grooves sandwiching the land also change. The wobble signal amplitude becomes smaller when the wobble signals are in a reversed phase, but becomes almost equal to the wobble signal amplitude on the grooves when they are in phase. The following will explain this using a specific example. A quantitative explanation will be given later with reference to FIGS. 8-10 when an embodiment of the present invention is described.

FIG. 1 shows a specific example of the case where the above-mentioned assumption cannot be used as a basis, and shows the waveform of a push-pull signal in relation to an optical disc that was manufactured by way of trial by setting the wobble length to be constant (only in regards with clock information). The waveform on the left-hand side is a push-pull signal waveform for one rotation of an eccentric disc in the tracking-off state. The waveforms on the right-hand side are respectively magnifications at (a), (b), and (c) of the waveform on the left-hand side. The figure shows how the wobble signal is superimposed on the TE signal. The waveforms at (a) and (b) are those of approximately the same track and have opposite track moving directions relative to the optical spot. In the waveforms at (a) and (b), the wobble signal amplitude is decreased at decay and rise, respectively.

In the above waveforms, the portions having small wobble signal amplitudes can be judged as lands. The moving direction was confirmed by comparing the jumping waveforms which were observed separately from the waveforms. According to the observation, the waveforms at (a) and (b) have optical spot moving directions respectively outward and inward relative to the track. However, in regards with the wave form at (c), the moving direction cannot be determined from the wobble signal amplitude because the wobble signal amplitude is constant at both rise and decay.

The specific data provided above indicates that in the CLV-type optical discs, the assumption that "there is, without fail, a difference between lands and grooves in the wobble signal amplitude" cannot be used as a basis. Also, in optical discs in which the wobble signal is modified by the address information practically, there is a problem that even a portion, where it is expected that the wobble phase is reversed on lands to decrease the wobble signal amplitude, becomes partially in-phase (or close to in-phase) due to the modulation and thereby generates a spike-like increase of the wobble signal amplitude, though the problem depends on the modulation method. That is to say, the third technology has a problem that the wobble signal amplitude is not enough to judge the tracking polarity or detect the optical spot moving direction.

Meanwhile, the assumption that "there is, without fail, a difference between lands and grooves in the wobble signal amplitude" cannot be used as a basis even for ZCLV optical discs such as DVD-RAM. More specifically, in DVD-RAM, the wobble is used only in the clock signal. In DVD-RAM, the groove wobble is formed so as to be in-phase within a zone so that a wobble signal amplitude equal to the groove can be obtained in recording on lands, as well as in recording on grooves. That is to say, even on a land between grooves, the wobble signal amplitude is not decreased. It should be noted here that mediums such as DVD-RAM in which the grooves and lands have the same wobble signal amplitude are not the object of the present invention.

DISCLOSURE OF THE INVENTION

To solve the above-described problems, the present invention performs judgment of the tracking polarity and detection of the moving direction accurately in an optical disc having wobble grooves by judging, as a land, a TE signal zero-cross point at which the wobble signal amplitude is equal to or smaller than a predetermined value when the wobble signal amplitude changes on lands, and by the exterior when the relative moving speed of the optical spot is within a predetermined range. It is an object of the present invention to provide tracking control apparatus and method that, even in an optical disc that has an area in which no information has been recorded and there is no reflectance ratio difference between grooves and lands, enable the tracking lead-in to be performed stably and accurately during an activation or a seek, not by the one-beam or DPP detection method, and achieves high-speed and stable activation and seek.

The above object is fulfilled by a tracking control apparatus for an optical disc which has wobble grooves as tracks, comprising: a signal detection unit operable to detect a tracking error signal and a wobble signal from an optical spot focused on the optical disc; a speed calculation unit operable to calculate, in a tracking-off state, a relative moving speed between the optical spot and the tracks, from (i) a zero-cross point cycle in the tracking error signal and (ii) a track pitch; a polarity judgment unit operable to judge, by a polarity judgment, that the optical spot is on a land if a wobble signal amplitude value is equal to or lower than a predetermined value in vicinity of a zero-cross point; and a moving direction judgment unit operable to, when the relative moving speed is within a predetermined range and the polarity judgment unit has judged that the optical spot is on a land, judge a moving direction of the optical spot relative to the tracks, from a rise/decay direction of the tracking error signal.

The above-described construction enables the tracking polarity and the relative moving direction between the optical spot and the tracks to be judged accurately from the wobble signal amplitude.

The above-stated tracking control apparatus may further comprise a control unit operable to perform a tracking lead-in by reducing the relative moving speed, based on the relative moving speed calculated by the speed calculation unit and the moving direction, and the moving direction judgment unit judges whether the optical spot is moving from an inner circumference track toward an outer circumference track or from the outer circumference track toward the inner circumference track, according to whether a differential coefficient of the tracking error signal is positive or negative.

The above-described construction enables the moving direction to be judged easily. This provides a stable, highly accurate tracking lead-in during an activation of the optical disc apparatus or a seek.

In the above-stated tracking control apparatus, the control unit may include: an eccentricity storing sub-unit operable to calculate an amount of eccentricity per rotation of the optical disc, from a moving speed and a moving direction that are calculated and judged by the speed calculation unit and the moving direction judgment unit based on the tracking error signal corresponding to one-half or more rotation of the optical disc, and to store data of the calculated amount of eccentricity; a following operation sub-unit operable to cause the optical spot to follow a specific track among a plurality of eccentricity tracks crossing the optical spot, with timing when the specific track passes the optical spot, based on the amount of eccentricity stored in the eccentricity storing sub-unit; and a first lead-in sub-unit operable to lead a tracking into the specific track or a track in vicinity of the specific track while the optical spot is following the specific track.

The above-described construction makes it possible to lead the tracking into a vicinity of a given track in a stable manner at a high speed even if a large amount of optical disc eccentricity is observed during an activation of the optical disc apparatus.

In the above-stated tracking control apparatus, the specific track may be approximately at a center of the plurality of eccentricity tracks.

The above-described construction enables the average value of an objective lens shift after a tracking lead-in to be close to "0". This enables a recording/reproduction to be started with no wait time for correction of an amount of shift by a traverse.

In the above-stated tracking control apparatus, the control unit may include: an eccentricity storing sub-unit operable to calculate an amount of eccentricity per rotation of the optical disc, from a moving speed and a moving direction that are calculated and judged by the speed calculation unit and the moving direction judgment unit based on the tracking error signal corresponding to one-half or more rotation of the optical disc, and to store data of the calculated amount of eccentricity; a second following operation sub-unit operable to cause the optical spot to follow a track that is approximately at a center of the plurality of eccentricity tracks, based on the amount of eccentricity stored in the eccentricity storing sub-unit; and a second lead-in sub-unit operable to, with given timing, lead a tracking into the track approximately at the center of the plurality of eccentricity tracks.

The above-described construction enables the tracking to be lead into the central track with quicker timing. This provides high-speed activation or recovery of the optical disc apparatus.

In the above-stated tracking control apparatus, the control unit may include: an amplitude calculation sub-unit operable to calculate a wobble signal amplitude of a land that is adjacent to a given point on a track of the optical disc, using a reference radius position of a wobble phase, a track pitch, a wobble length, a track number, and a rotation angle; an amplitude storing sub-unit operable to store, as a measurement data sequence of wobble signal amplitude, moving directions that are judged by the moving direction judgment unit prior to a tracking lead-in at an end of a seek by restricting a moving speed of the optical spot to within the predetermined range; and an error correction sub-unit operable to correct an error of a groove count value in a middle of a seek of an object track, according to a correlation between (i) a data sequence of wobble signal amplitude values for a plurality of lands crossed by the optical spot that are calculated by the amplitude calculation sub-unit from groove count values counted during the seek of the object track and (ii) the measurement data sequence, using the calculated wobble signal amplitude value data sequence as a template.

The above-described construction makes it possible to correct the groove count error in the middle of a seek and reach the object track at one try, achieving a high-speed, stable seek.

In the above-stated tracking control apparatus, the polarity judgment unit includes at least one of: a first judgment sub-unit operable to judge that the optical spot is on a groove if a RF signal amplitude value from the optical disc is equal to or higher than a predetermined value; a second judgment sub-unit operable to judge whether the optical spot is on a groove or a land based on total light quantity signals from the groove and the land of the optical disc if there is a difference between the total light quantity signals; and a third judgment sub-unit operable to judge whether the optical spot is on a groove or a land based on total light quantity signals from the groove and the land of the optical disc if there is a difference between the total light quantity signals, excluding portions of the optical disc for which the RF signal amplitude value from the optical disc is equal to or higher than the predetermined value, wherein the moving direction judgment unit further judges the moving direction of the optical spot relative to the tracks from the rise/decay direction of the tracking error signal if any of the first to third judgment sub-units judges by a polarity judgment whether the optical spot is on a groove or a land.

The above-described construction enhances the accuracy of the polarity judgment and improves the stability of the tracking lead-in during an activation or a seek.

The above object is also fulfilled by a tracking control method for an optical disc which has wobble grooves as tracks, comprising the steps of: detecting a tracking error signal and a wobble signal from an optical spot focused on the optical disc; calculating, in a tracking-off state, a relative moving speed between the optical spot and the tracks, from a zero-cross point cycle in the tracking error signal; judging, by a polarity judgment, that the optical spot is on a land if a wobble signal amplitude value is equal to or lower than a predetermined value in vicinity of a zero-cross point; and judging a moving direction of the optical spot relative to the tracks from a rise/decay direction of the tracking error signal when the relative moving speed is within a predetermined range and it has been judged that the optical spot is on a land.

The above-described construction enables the tracking polarity and the relative moving direction between the optical spot and the tracks to be judged accurately from the wobble signal amplitude.

The above object is also fulfilled by a tracking control program for causing a computer to perform a tracking control of an optical disc which has wobble grooves as tracks, comprising the steps of: detecting a tracking error signal and a wobble signal from an optical spot focused on the optical disc; calculating, in a tracking-off state, a relative moving speed between the optical spot and the tracks, from (i) a zero-cross point cycle in the tracking error signal and (ii) a track pitch; judging, by a polarity judgment, that the optical spot is on a land if a wobble signal amplitude value is equal to or lower than a predetermined value in vicinity of a zero-cross point; and judging a moving direction of the optical spot relative to the tracks from a rise/decay direction of the tracking error signal when the relative moving speed is within a predetermined range and it has been judged that the optical spot is on a land.

The above-described construction for the tracking control, when applied to a tracking control apparatus, enables the tracking polarity and the relative moving direction between the optical spot and the tracks to be judged accurately.

BEST MODE FOR CARRYING OUT THE INVENTION

The following describes embodiments of the present invention with reference to the attached figures.

Embodiment 1

Prior to the description of Embodiment 1, a quantitative explanation of the wobble signal amplitude, which is important in understanding the embodiment, will be given with reference to FIGS. 2, 3, and 4.

Quantitative Explanation of Wobble Signal Amplitude

Figure 1:
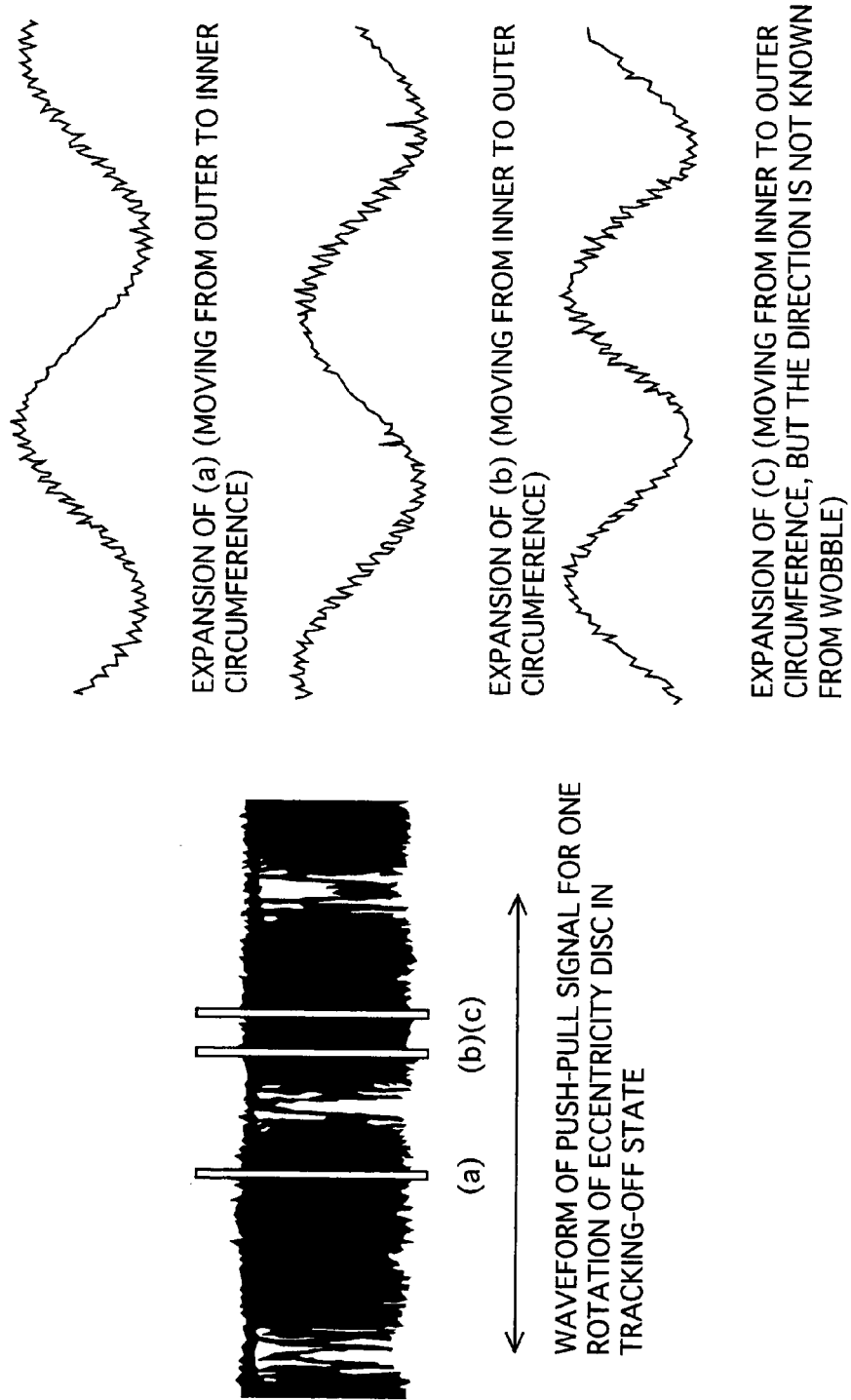
FIG. 1 shows the waveform of a push-pull signal in relation to an optical disc having wobble grooves.
Figure 2:
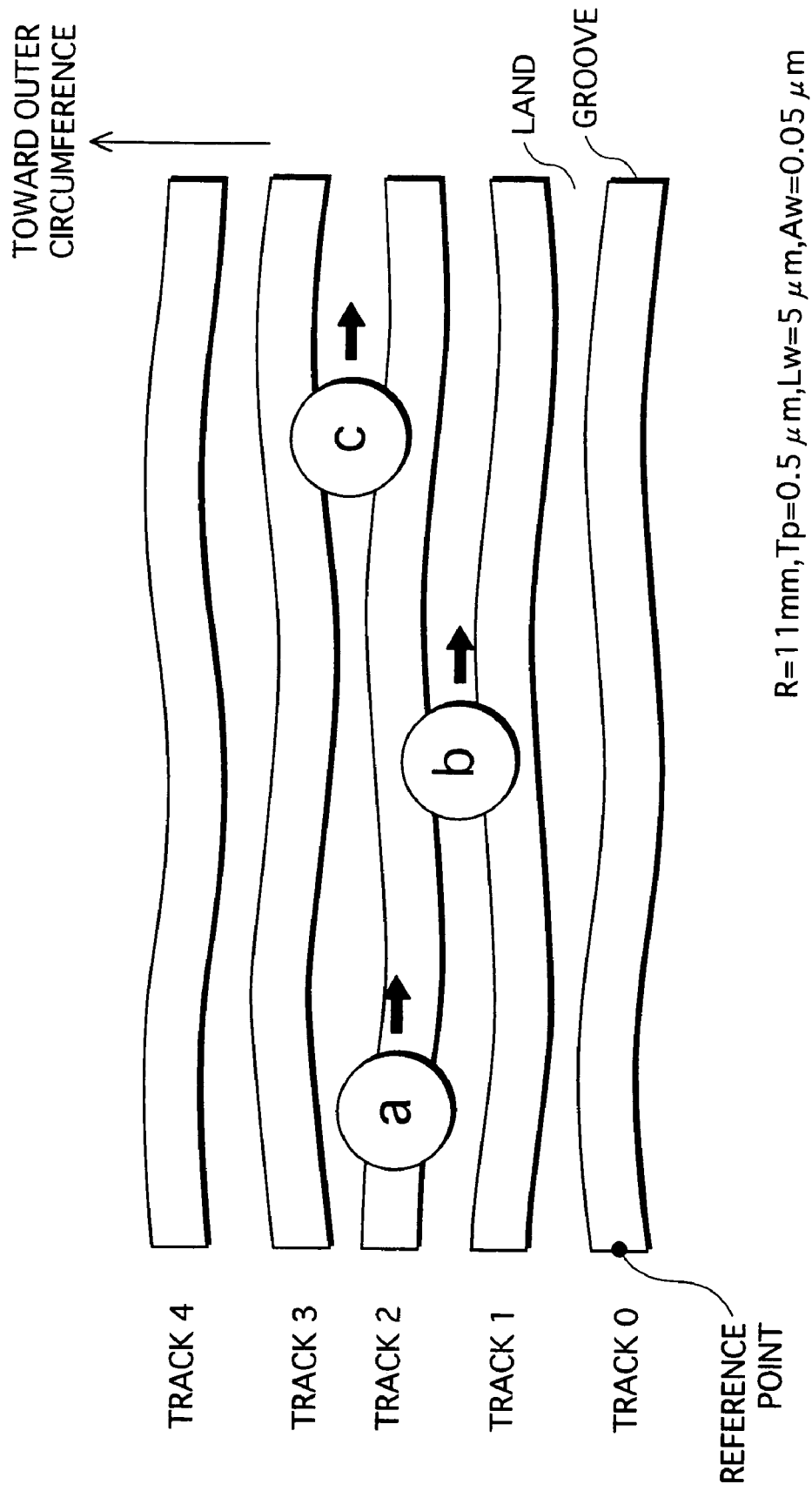
FIG. 2 shows a relationship between the wobble grooves and scanning by the optical spot.
Figure 3:
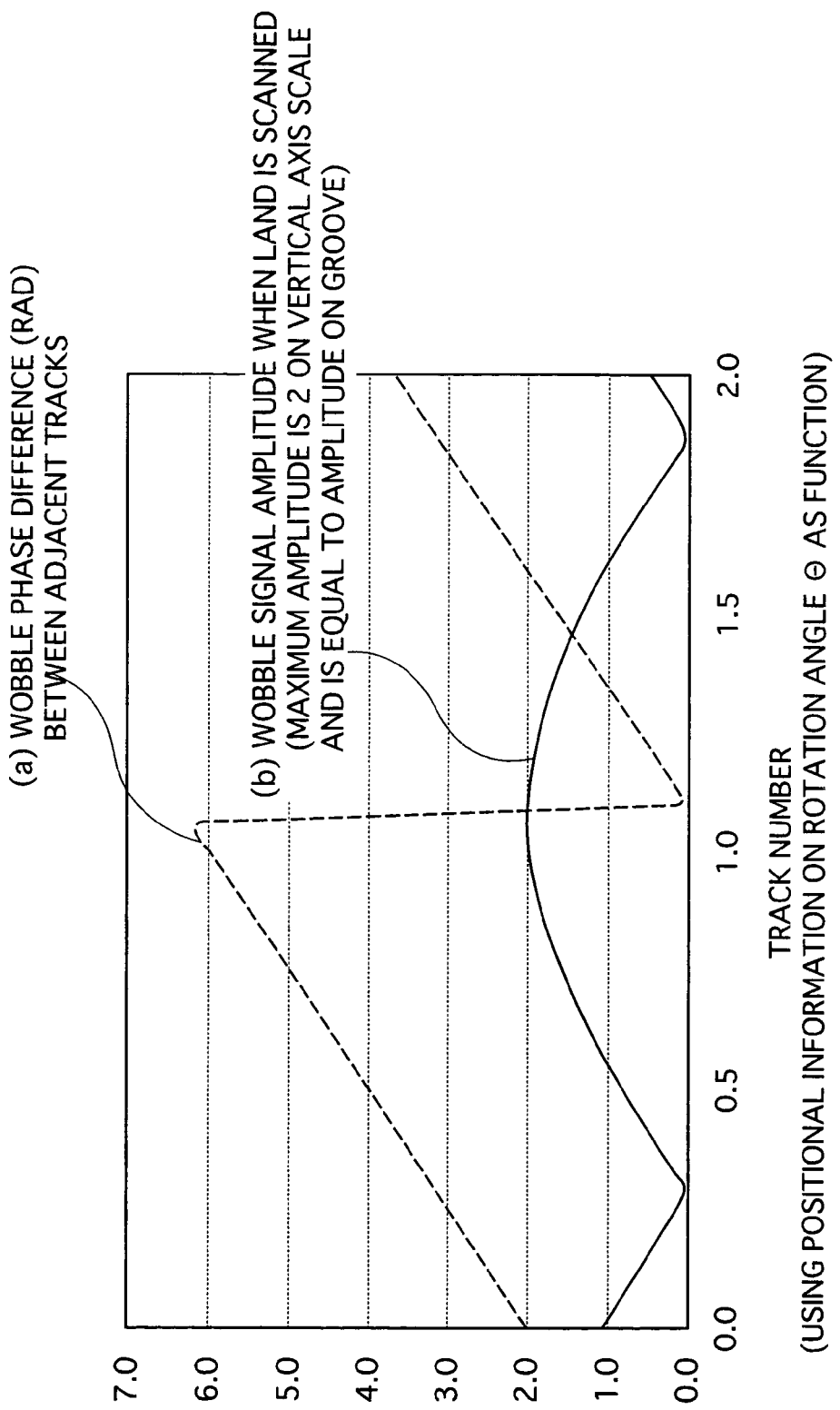
FIG. 3 shows the wobble phase difference between two adjacent tracks and the wobble signal amplitude.
Figure 4:
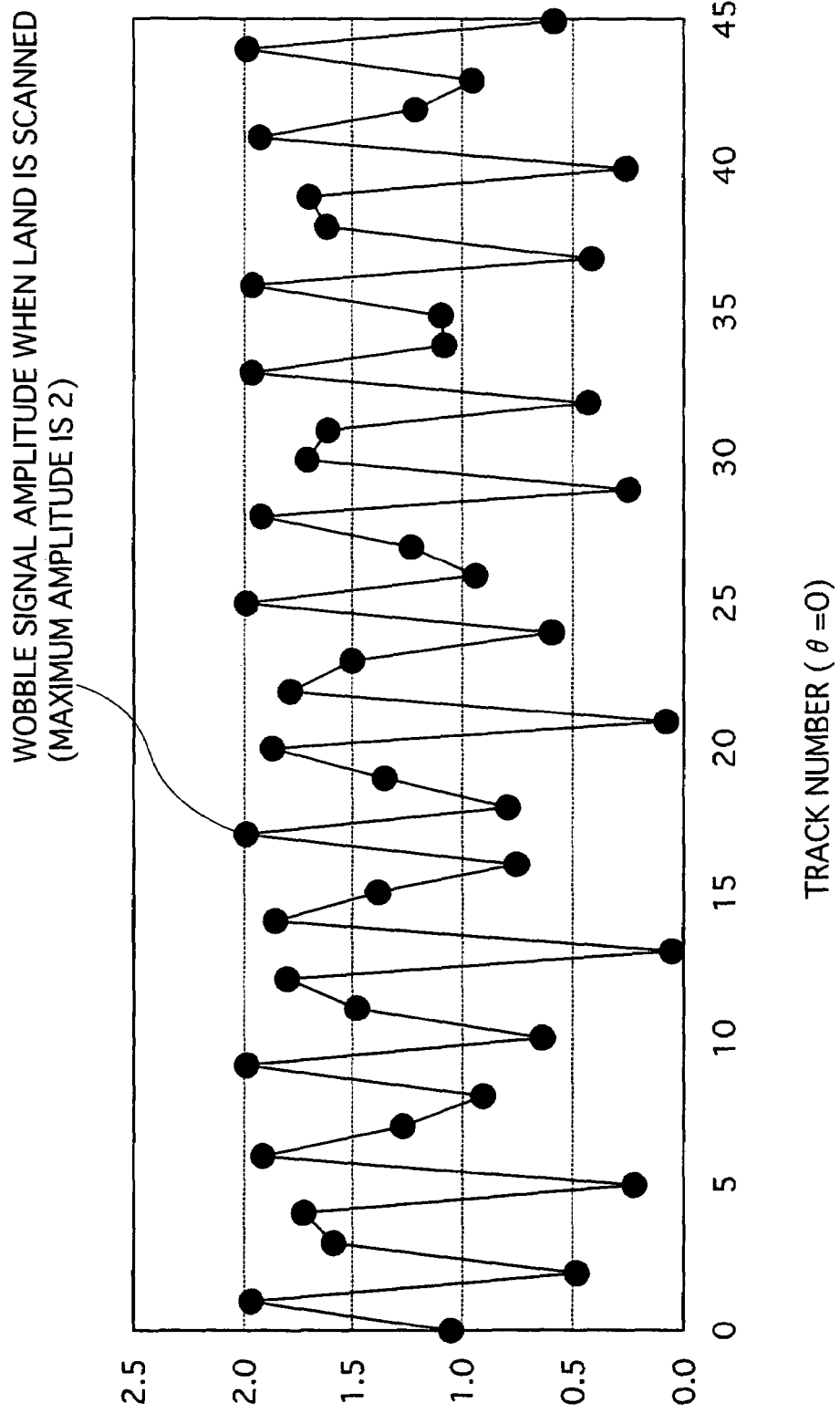
FIG. 4 shows values of the wobble signal amplitude for each track.

FIGS. 2-4 show results of calculations on how the wobble signal amplitude on lands, which is the main point of the present invention, changes depending on the track position. It is supposed here that the optical disc in this embodiment is based on the CLV system in which the grooves are cut in a spiral with a predetermined track pitch from the inner circumference toward the outer circumference, and that the wobble is a sine wave having a predetermined length.

The wobble phase of the grooves is determined by the length of the grooves that have already been cut. The groove length Lg (m) is represented by Equation 1 shown below, where R (m) denotes the radius of the cutting origin (reference point), ω (rad) denotes a total rotation angle of the cutting, and Tp (m) denotes the track pitch. The equation was obtained from a generalization of the concept that "the length of one rotation of a spiral is the average of (i) a circumference length of a circle that includes the origin of the spiral and (ii) a circumference length of a circle that includes the end of the spiral, the circles having the same center". Here, if the groove extending from the origin to the end of one rotation of a spiral is regarded as one track, Tn denotes the track number starting with "0", and θ denotes a rotation angle on the track from the origin, the total rotation angle is also represented as $2\pi Tn+\theta$.

$$Lg=\omega(R+\omega*Tp/4\pi) \quad \text{Equation 1}$$

A displacement D (m) in the radial direction of a groove on which an actual wobble is formed is represented by the following Equation 2, where Lw (m) denotes a wobble length, and Aw (m) denotes a wobble amplitude. For obtaining the displacement, it is presumed that the phase of the origin is "0" and that the direction toward the outer circumference is positive.

$$D=Aw*\sin(2\pi*Lg/Lw) \quad \text{Equation 2}$$

FIG. 2 is an enlarged view showing how the wobble grooves are arranged on an optical disc, based on calculations of the wobble state of the grooves using Equations 1 and 2. The calculation conditions are R=11 mm, Tp=0.5 μm, Aw=0.05 μm, and L/G ratio=1. FIG. 2 shows five tracks for approximately 1.5 cycle of wobble, starting with origin θ=0. It should be noted here that "Aw" in the figure is larger than the actual wobble amplitude, the arrangement being made for the purpose of exaggerating the wobble state.

As apparent from the figure, each track has a different wobble phase. The signs "a", "b", and "c" indicate positions of an optical spot scanning the optical disc, which are provided for a study of the wobble signal amplitude. When the optical spot is at "a" scanning Track 2, the wobble signal amplitude of a predetermined value is obtained stably along the groove winding its way. When the optical spot is at "b" in a land between Tracks 1 and 2, the wobble signal amplitude of a predetermined value is obtained stably as is the case with the optical spot being at "a" because both tracks have approximately the same wobble phase and the wobble signal amplitude and there is no possibility that a smaller wobble signal amplitude is obtained. In contrast, when the optical spot is at "c" in a land between Tracks 2 and 3, which are substantially reversed in the wobble phase, the wobble signal amplitude is approximately "0".

It is supposed here that the optical spot moves in scanning directions indicated by the thick arrows in the figure according to the rotation of the optical disc. In the tracking-off state, the optical spot moves in the radial direction crossing the grooves and lands, due to the eccentricity of the optical disc or the necessity to move the optical spot. In the figure, it is supposed that the moving speed is relatively slower than the scanning speed, and that the optical spot scans only grooves and lands. To observe the wobble signal amplitude properly on a groove or a land, 10 wobbles, for example, need to be observed during the time taken by the optical spot to move from a groove to a land. In the case of the example shown in FIG. 2, the moving speed/scanning speed ratio is not higher than 0.5*0.5/(5*10) When the scanning speed is 2.5 m/second, the moving speed needs to be 12.5 mm/second or lower, which is the level required by the eccentricity of the optical disc. If it is presumed that the eccentricity of the optical disc can be approximated by a sine wave, with the amount of eccentricity being set to a slightly large value of 50 μm (0p), then the maximum eccentricity speed is calculated as 11.4 mm/second as a result of multiplying the rotation angle speed (2.5/0.011 rad/second) for R=11 mm by the amount of eccentricity.

FIG. 3 shows calculation examples of the wobble phase difference between two adjacent tracks and the wobble signal amplitude in scanning a land. A distance Lt (m) between an object point on a track (total rotation angle=ω) and a point on an outer adjacent track (total rotation angle=ω+2π) is obtained from Equation 3 shown below which is a calculation of a difference between results of Equation 1 that is obtained by assigning these total rotation angles respectively to Equation 1. A phase difference d (rad) is obtained by multiplying 2π by a remainder of dividing the distance Lt by the wobble length Lw (Equation 4). Equation 5 represents a value of the wobble signal on a land at the object point. The value is an instantaneous value. The wobble signal amplitude is obtained in terms of at least one cycle of wobble signal amplitude near the object point. More specifically, the wobble signal amplitude can be calculated from the absolute value of the constant term "2 cos(d/2)" of Equation 5 since the wobble length is small enough relative to the circumference of the circle. FIG. 3 shows examples of values of the phase difference and the wobble signal amplitude in terms of two tracks starting with the cutting reference point 0. The values were obtained with the same calculation conditions as those in FIG. 2. The horizontal axis indicates track positions by the track number Tn and the rotation angle θ, and indicates the phase difference and the wobble signal amplitude by (a) and (b). The phase difference gradually increases as the track position advances. It is possible to calculate the wobble signal amplitude in accordance with the phase difference. The maximum value of the wobble signal amplitude is "2". This value is equal to the wobble signal amplitude in scanning the land when the L/G ratio is "1", and is a relative value. The absolute value of the amplitude is determined by a physical wobble amplitude Aw on the disc.

$$Lt=\omega*Tp+\pi(2R+Tp) \quad \text{Equation 3}$$

$$d=2\pi(Lt/Lw) \quad \text{Equation 4}$$

$$\sin(\omega)+\sin(\omega+d)=2\sin(\omega+d/2)\cos(d/2) \quad \text{Equation 5}$$

As described earlier, Equations 3, 4, and 5 can be used to calculate the wobble signal amplitude of a land of a predetermined track at a predetermined rotation angle. FIG. 4 shows values of the wobble signal amplitude for each track number when the rotation angle is fixed to "0", the values having been calculated with the same calculation conditions as those in FIGS. 2 and 3. It shows a specific pattern that the value of the wobble signal amplitude drops every several tracks. Every three tracks, the value becomes lower than "1" that is half the regular value "2". When θ changes, the minimum track number changes. The rule of the change greatly depends on the track pitch Tp and the wobble length Lw. The smaller the value Tp is and the larger the value Lw is, the longer the cycle of change is. This is because the phase change per rotation is small.

Up to now, a quantitative explanation of the wobble signal amplitude has been provided. Now, the embodiments of the present invention will be explained with reference to the drawings.

Construction of Embodiment 1

Figure 5:
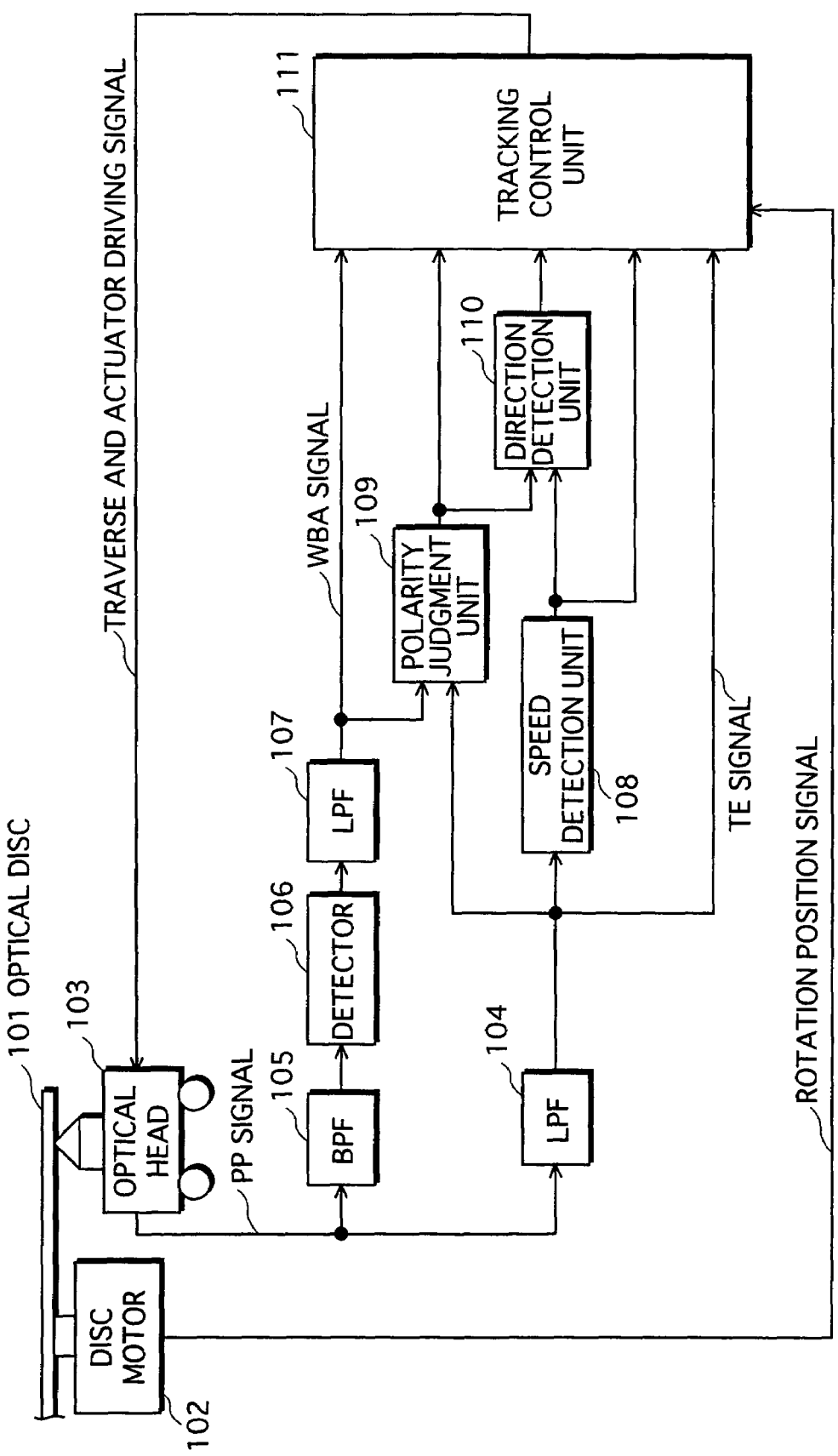
FIG. 5 is a block diagram of Embodiment 1 of the present invention.

FIG. 5 is a block diagram of Embodiment 1 of the present invention. FIG. 5 shows only main components of the tracking control apparatus in the optical disc apparatus. It is supposed here that an optical disc 101 is of a CLV control type in which the inner circumference is the lead-in, and the grooves are wobble grooves that are wound by the wobble signal that is generated by modulating, by address information, a clock for CLV control having a predetermined length. The clock is also used as a reference clock for recording information. It is also supposed that for the modulation of the clock by the address information, PSK (Phase Shift Keying) and/or FSK (Frequency Shift Keying) is used, where in the PSK, a clock having a predetermined clock cycle among a plurality of clocks is set to have a reversed phase of a normal clock phase, and in the FSK, the clock frequency is changed only for several clock cycles. In this system, different from the FM modulation by the ADIP system, even in a portion where the wobble signal amplitude on a land is expected to be decreased, the wobble signal amplitude is increased spike-like since grooves sandwiching the land at modulated clock cycles have the same wobble phase (this phenomenon is called partial amplitude variation). The number of clocks to be modulated is adjusted to approximately one tenth or less of the standard clock so as not to be a disturbance in detecting a synchronization with the clock. Data is recorded/reproduced by tracking lands.

When an optical disc apparatus is activated, the optical disc 101 has a disc motor 102 rotate with a predetermined number of rotations, an optical head 103 is traversed to the inner circumference by a traverse means (not illustrated), emits laser light, focuses properly, and forms an optical spot on the optical disc 101. The disc motor 102 outputs a rotation position signal that is used to detect the optical spot on the optical disc 101 as rotation angle information. The rotation position signal is acquired from a FG sensor provided in the disc motor 102 or from a sensor for detecting an index mark. Alternatively, an index mark by a reflectance ratio difference may be attached to the optical disc 101, and the attached index mark may be detected by an optical sensor. Values for the rotation angle information are obtained from the rotation position signal, the number of rotations of the disc motor 102, or the phase of the driving signal of the motor, at any given time.

The optical head 103 has an optical detector (not illustrated) embedded therein, the optical detector being divided into two to align in the radial direction. The optical head 103 outputs a differential signal from the optical detector as a push-pull signal (PP signal). It is supposed here that the PP signal is detected from one beam. A tracking error signal (TE signal) is obtained as a low-pass filter LPF 104 removes the wobble signal component from the PP signal. To detect the wobble signal amplitude, first, a wobble signal is obtained by allowing the PP signal to pass through a band-pass filter BPF 105 of a wobble signal band, and then allowing the wobble signal to pass through a detector 106 to obtain an amplitude component. The amplitude component obtained here includes the partial amplitude variation due to modulation of the address information as described earlier. As a result, to remove the partial amplitude variation, the amplitude component is further allowed to pass through a low-pass filter LPF 107 to obtain a WBA signal that indicates the wobble signal amplitude. A signal detection unit can comprise the optical head 101, the band-pass filter 105, the detector 106, the low-pass filter 107, and/or the low-pass filter 104.

A speed detection unit 108 detects a relative moving speed between an optical spot and a track on the optical disc 101 by measuring the cycle of a zero-cross point of the TE signal. To detect the zero-cross point, a hysteresis comparator or the like is used to remove the noise component. A polarity judgment unit 109 checks the WBA signal in correspondence with a section around the zero-cross point of the TE signal in terms of time, and if it detects that the WBA signal is equal to or lower than a predetermined value (for example, a half of the reference amplitude), it judges that the corresponding section is a land by the tracking polarity judgment. In doing this, if there is a phase difference between the TE signal and the WBA signal due to characteristics of each filter, the polarity judgment unit 109 makes an adjustment so that a time delay is not caused. The polarity judgment unit 109 further notifies a direction detection unit 110 whether a differential coefficient of the TE signal, interms of the section that was judged to be a land by the polarity judgment, is increase or decrease.

When the moving speed detected by the speed detection unit 108 is within a predetermined range, the direction detection unit 110 detects and determines a moving direction from the differential coefficient. A tracking control unit 111 performs a tracking lead-in stably by driving a traverse and actuator when the optical disc apparatus is activated or a seek ends, using the above-described WBA signal value, moving speed, and detected direction. How the tracking lead-in is performed will be described later.

It is supposed here that the upper limit of the predetermined range of the moving speed is a speed at which the WBA signal can be measured on a groove or a land, for example not higher than 12.5 mm/second which was explained earlier in relation to the wobble signal amplitude. However, this value may be set to a larger value depending on the parameter settings of the object optical disc or the design of the optical disc apparatus since this value depends on the accuracy of the method of detecting the wobble length or wobble signal amplitude. Also, the lower limit of the predetermined range of the moving speed is set to be equal to or lower than a band in which the tracking lead-in can be performed stably. For example, if a tracking gain intersection point has been set to 3 kHz, it is well possible to lead in the TE signal of approximately 1 kHz. The moving speed converted from this is 0.5 mm/second when, for example, Tp=0.5 μm.

The lower limit of the predetermined range of the moving speed may be set to be equal to or lower than a band in which the tracking lead-in can be performed, if it is judged, from measurement results of change with time and cycle of the TE signal and/or measurement results of the amount of eccentricity of the optical disc (which will be described later), that no inverse of the moving direction is to happen. The moving direction inversion can be detected from the local minimum point of the amount of change in the zero-cross cycle of the TE signal, from the behavior of the TE signal around the local minimum point, from the WBA signal, and so on. The inversion position can be identified from the amount of eccentricity and direction stored in an eccentricity memory, which will be described later, and from the rotation angle of the eccentricity optical disc. When the optical spot is stationary, the position at which the eccentricity direction is inversed is the same as that at which the moving direction is inversed. Also, if the optical spot moving speed is known from a source other than tracks, it is possible to identify a rotation angle to be inversed, from an offset of the value.

Explanation of Direction Detection Operation

Figure 6:
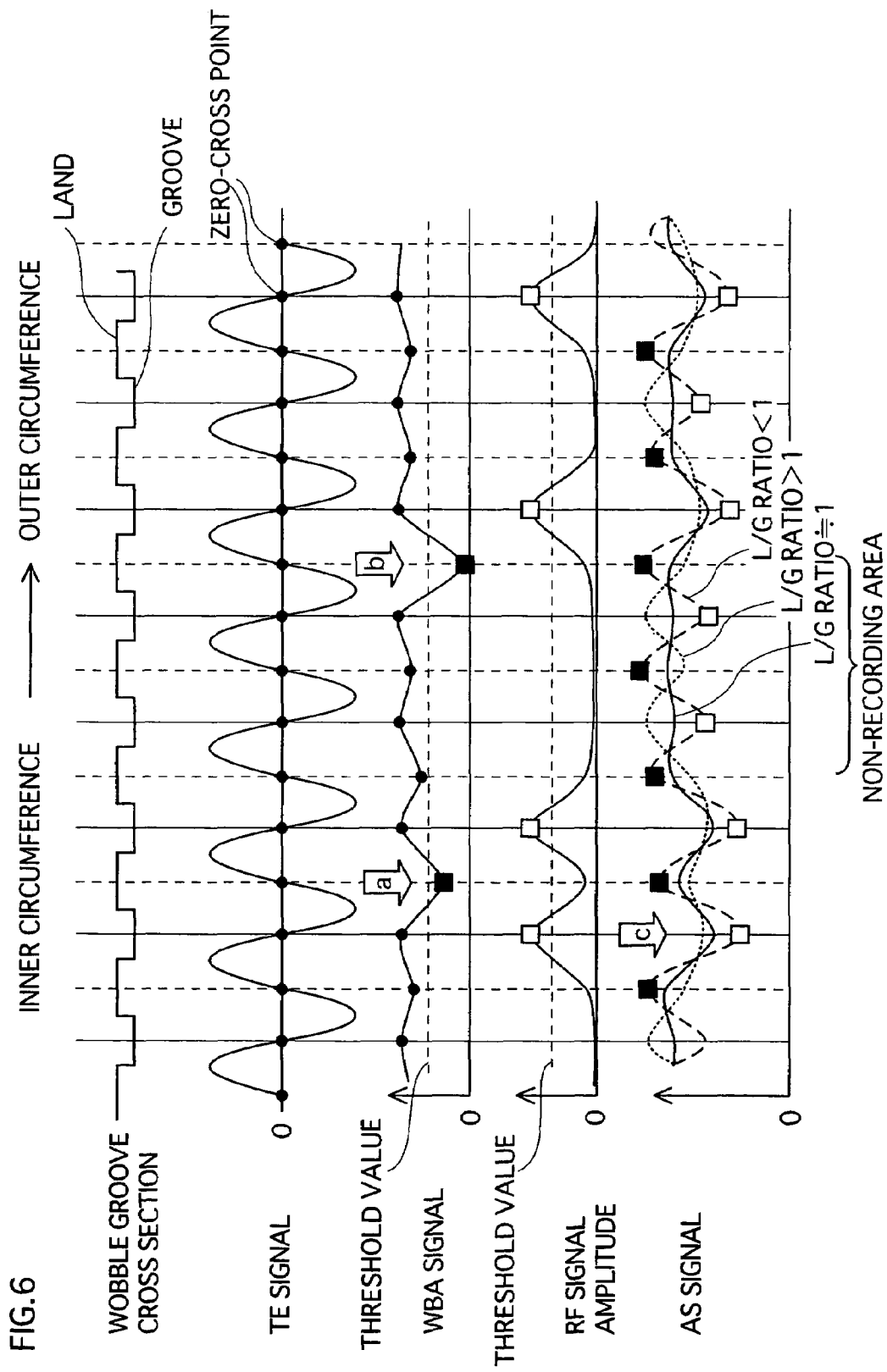
FIG. 6 shows operation timing in Embodiment 1.

The above-mentioned operations will be described in more detail with reference to FIG. 6. In FIG. 6, the uppermost row shows a sectional view of the wobble grooves formed in the optical disc, and the other rows, from top to bottom, show the TE signal, WBA signal, and RF signal amplitude measured as the optical spot moves over the wobble grooves, and the AS signal (full-addition signal) from the optical spot. It is supposed here that the optical disc is rotating with eccentricity 0 and a predetermined number of rotations, and the optical spot is moving at such a level of speed as the WBA signal does not change on lands. The RF signal amplitude and the AS signal are shown to indicate how a direction is detected when there are tracks on which data has been recorded, and when there is a difference in the reflectance ratio between grooves and lands.

It is supposed here that the optical spot is moving in a direction from the inner circumference, which is on the left-hand side of FIG. 6, toward the outer circumference, which is on the right-hand side of FIG. 6. In the wobble cross section shown in FIG. 6, the downward convexes represent grooves, and the solid lines indicate the centers of the grooves. The dotted lines indicate the centers of the lands. As shown in FIG. 6, the TE signal takes value "0" in each groove and each land. This means that when the optical spot is moving, a zero-cross occurs in each groove and each land. In this example, it is supposed that the optical head 103 has been set so that the polarity of the TE signal is positive when the optical spot slightly moves from the center of a land (not the center of a groove) toward the outer circumference, and that the polarity is negative when the optical spot slightly moves from the center of a land toward the inner circumference.

When, as shown in FIG. 6, the optical spot moves with time from the inner circumference to the outer circumference, the differential coefficient of the land at a zero-cross is positive. Conversely, when the optical spot moves with time from the outer circumference to the inner circumference, the differential coefficient is negative. This means that the moving direction can be detected by checking the polarity of the differential coefficient at a point that is judged as land. The WBA signal takes values that are lower than the threshold value, as indicated by downward arrows "a" and "b" shown in the middle of FIG. 6. At each of the points "a" and "b", a zero-cross occurs in the TE signal, and the differential coefficient is positive at each of the points. Therefore, it is judged for each of the points "a" and "b" that the optical spot is moving in a direction from the inner circumference toward the outer circumference. For example, the threshold value may be set to ½ of a peak value among values, excluding abnormal values, taken by the WBA signal at zero-cross points while the optical spot is moving. This setting makes it possible to detect the polarity well since, as explained in relation to FIG. 4, this enables one out of every three lands to be detected. As mentioned earlier, the land wobble signal amplitude value for each track changes if the wobble length or the track pitch changes. It is accordingly preferable that the threshold value is determined based on calculation results of these values so that approximately ⅓ of the entire lands can be detected.

Basically, one point is used for judging the moving direction. However, the reliability of the direction detection may be enhanced by adopting (1) a method of using a plurality of points for the judgment, (2) a method of confirming that an average value of the WBA signal, which was obtained from zero-cross points judged as lands by a judgment other than the judgment of "0" or "1" based on a threshold value, is larger, by a predetermined value or more, than an average value of the WBA signal at zero-cross points judged as grooves, or (3) a method of confirming that variations of the value of the WBA signal obtained from zero-cross points judged as lands are larger than variations of the value of the WBA signal obtained from zero-cross points judged as grooves. It should be noted here that for the detection of the WBA signal, the WBA signal need to be normalized in advance by the AS signal if there a large difference in the AS signal value between grooves and lands. Especially, this normalization is indispensable when average values of the WBA signal are measured.

The detection of the moving direction is effective when the moving speed is within a predetermined range, and is ineffective when the moving speed is lower than the predetermined range. The direction detection is not performed when the moving speed is higher than a predetermined value, which happens when the eccentricity of the optical disc is large or when the traverse is moved in the middle of a seek. This is because the WBA signal is not detected when the moving speed is higher than the predetermined value. However, once a moving direction is detected, the detected moving direction remains to be effective because the speed has not been decreased. When a seek is performed, the moving direction is known beforehand. As a result, it is possible to confirm whether the seek control is normally operated by presetting the moving direction in the direction detection unit 110, and loading into the direction detection unit 110 a function that confirms whether the preset moving direction matches a direction that is detected when the moving speed is decreased to equal to or lower than a predetermined moving speed as the optical spot comes close to an object track.

The RF signal amplitude shown in FIG. 6 is a waveform in the case where data is recorded on some tracks, and data is not recorded on other tracks. In this example, data is recorded on four tracks, and the four white boxes indicate that the RF signal amplitude exceeds a threshold value when the optical spot passes the grooves corresponding to the four tracks on which data is recorded. With conventional technologies, the direction is detected correctly only when data is recorded on continuous tracks. However, with such a method disclosed in the present embodiment, it is possible to judge, as a groove (not a land), a point where the RF signal amplitude is equal to or higher than a threshold value in correspondence with a zero-cross point in the TE signal, and judge the moving direction correctly from the differential coefficient of the TE signal at the time. It should be noted here that the polarity of the differential coefficient is opposite to that in the case where the WBA signal is used. Also, the upper limit of the moving speed range can be set to a value higher than that in the case where the wobble signal amplitude is used. This is because the RF signal has a higher frequency than the wobble signal, and the amplitude of the RF signal can be detected when the optical spot moves at a high speed.

FIG. 6 shows, in the bottom row, how the reflectance ratio difference between grooves and lands is observed in correspondence with the L/G ratio of the optical disc. It is found from the "non-recording area" that the AS signal cannot be used to detect the direction when the L/G ratio is substantially "1" because in this case, the AS signal substantially shows no reflectance ratio difference (see the solid line). However, the AS signal shows great differences between grooves and lands when the L/G ratio is either larger or smaller than "1". For example, when the L/G ratio is smaller than "1", the reflectance ratio on the grooves (white rectangles) is smaller than the reflectance ratio on the lands (black rectangles). This can be used to detect the direction as in the conventional technologies.

It should be noted here that a conventional technology cannot be used as it is in the condition presumed in the present invention, namely in the condition that the reflectance ratio difference between grooves and lands cannot be defined by a format. This is because the direction detection may result in opposites depending on the L/G ratio. To avoid this, the reflectance ratio on grooves and lands in the tracking-on state may be measured, and then its difference between grooves and lands may be checked in advance, and the data may be used for the direction detection. It is possible to measure the reflectance ratio difference between grooves and lands even in the tracking-off state by referring to the polarity judgment results on the wobble signal amplitude or RF signal amplitude. Also, the reflectance ratio may be measured in advance at the stage of optical disc production, the measurement data may be recorded on the optical disc, and the data may be read during an activation.

This method, however, still has a problem. That is to say, as indicated by the arrow "c" in the bottom row of FIG. 6, the AS signal shows low reflectance ratio on grooves as recording tracks when recorded marks have low reflectance ratio as in recording on a phase change disc. This means that there is a possibility that the reflectance ratio difference between grooves and lands may be reversed. This phenomenon occurs when the L/G ratio is larger than "1" or substantially equal to "1". It is accordingly preferable that the L/G ratio is smaller than "1", but this cannot be assured. Even in such a case, a polarity judgment in the "thinned-out" state can be performed as is the case with the wobble signal or RF signal amplitude by excluding recording tracks by the RF signal amplitude and using the same means as the present embodiment. With this method, the excluded portions are judged as grooves by the RF signal amplitude. It is accordingly possible to judge the polarity of each groove from either the AS signal having a reflectance ratio difference (if it exists) or the RF signal amplitude.

Use of the above-described RF signal amplitude (when there is a recording track) and the AS signal (when there is a reflectance ratio difference between grooves and lands) together with the wobble signal amplitude in the polarity judgment and direction detection makes it possible to achieve a highly reliable detection.

Up to now, the tracking polarity judgment, moving speed detection, and direction detection using the TE and WBA signals have been explained. The following will explain the tracking lead-in operation using the direction detection result.

Tracking Lead-in Operation During Activation

Figure 7:
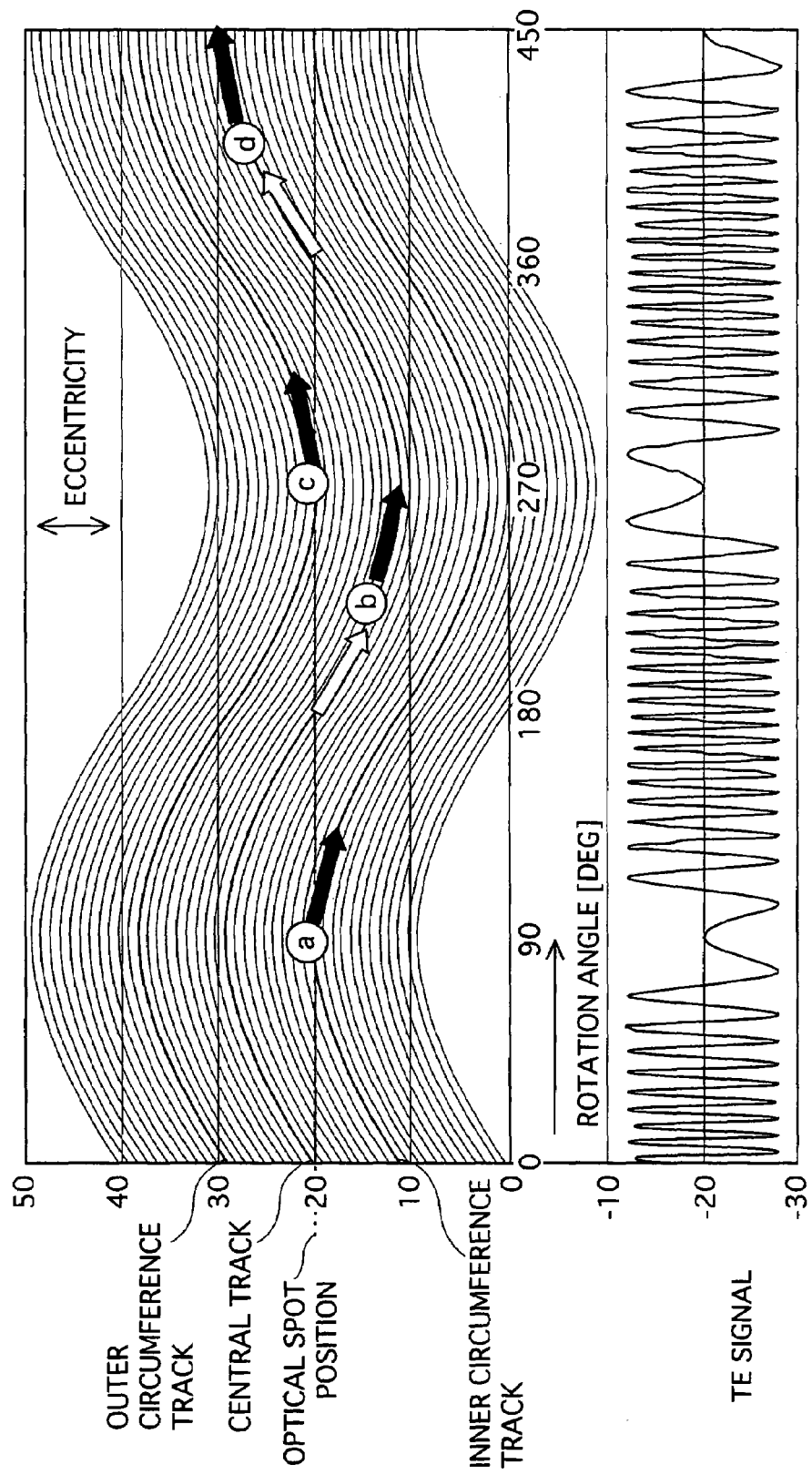
FIG. 7 shows the lead-in process without the eccentricity memory.

FIG. 7 shows the tracking lead-in operation performed by the tracking control unit 111. The upper portion of FIG. 7 shows sine waves indicating how tracks of the optical disc are eccentric. The amount of eccentricity shown in the figure is set to the range of ±9 for the sake of convenience though the range is smaller than reality. The horizontal axis indicates the eccentricity state corresponding to 1.25 rotations of an optical disc. It is supposed here that the optical spot remains stationary at a position indicated by the dotted line in the figure. When the optical disc rotates, tracks cross the optical spot due to the eccentricity (this is called a groove crossing). The groove crossing tracks as a whole are referred to as an eccentricity track group. Also, tracks at the outermost circumference, center, and innermost circumference in such an eccentricity track group are referred to as an outermost track, a central track, and an innermost track, respectively. In the example shown in FIG. 7, a cycle is repeated in accordance with the eccentricity state, where in each cycle, the central track crosses the optical spot at 0 degree of rotation angle, the innermost track at 90 degrees, the central track again crosses at 180 degrees, the outermost track crosses at 270 degrees, and the cycle starts again at 360 degrees of rotation angle.

It is desired that the lead-in track at the activation of the optical disc apparatus is such a track in which the average driving position of the objective lens of the optical head 103 is at the center of the optical axis after a tracking-on is performed without the normal traverse control. The track is what is called a track with minimum lens shift. More specifically, it is desirable that the tracking is lead into the central track or a track in the vicinity of the central track. When the tracking is lead into the outermost or innermost track, the track moving speed is slow and the tracking lead-in is easy, but the lens shift toward the outermost or innermost circumference becomes the largest, requiring the lens shift to be corrected, and therefore the recording/reproduction process cannot be started unless the traverse transfer time is over after the tracking-on. For this reason, it is supposed that the track into which the tracking is lead is the central track, except for the following special cases.

On example of the special cases is an intermittent recording/reproduction which is performed, for example, to reduce the power consumption. In the intermittent recording/reproduction, the traverse in the middle of recording/reproduction is stopped/fixed, the number of tracks that are lower than the lens shift range that does not affect the recording/reproduction is divided into recording/reproduction units, a continuous recording/reproduction is performed for each unit, and a move from the current unit to the next unit is done by a traverse. More specifically, first, the traverse is transferred to the central track of a recording/reproduction unit and is stopped there in the tracking-off state, then the tracking is lead into a track in the vicinity of the innermost track, and then only an actuator is used to access, from the track, a recording/reproduction starting track, and then only the actuator is used to follow tracks by a still-off (non-jumping) to perform the recording/reproduction, and after the recording/reproduction of the outermost track ends, the tracking is lead off. These procedures are repeated in the intermittent recording/reproduction. If the tracking is lead into a track in the vicinity of the innermost track, the fastest access to the recording/reproduction starting track, which is on the side of the inner circumference, can be gained. However, if recording/reproduction units are continuous, and recording/reproduction is performed continuously, recording/reproduction is performed continuously without tracking off.

The method for controlling the tracking lead-in changes depending on the amount of eccentricity. Therefore, the amount of eccentricity is measured before the tracking lead-in. For the measurement, an eccentricity storing function (not illustrated), which is called an eccentricity memory, is provided in the tracking control unit 111. The eccentricity storing function measures, during at least a half rotation of the optical disc, a rotation angle based on the rotation position signal of the disc motor 102, the detection results of the direction detection unit 110, and the amount of eccentricity from the zero-cross cycle of the TE signal, and stores the measurement as the amount of eccentricity of one rotation. In the case of a half rotation, the amount of eccentricity is calculated in the assumption that the remaining half rotation has eccentricity in the reversed phase, and the amount of eccentricity of one rotation is generated by incorporating the calculation result compensating data for the non-measurement area, and the data of the amount of eccentricity of one rotation is stored. If time allows, the amount of eccentricity of one rotation may be measured.

In case the amount of eccentricity is very small, the groove crossing speed of tracks crossing the optical spot is lower than a level at which the tracking lead-in is performed stably, and the number of eccentricity track group is small. Therefore, if the tracking is lead into a given track, the track is in the vicinity of the central track being the target. The eccentricity storing function does not operate normally if the amount of eccentricity is very small and the moving speed is equal to or lower than a predetermined value since the direction detection using the wobble signal amplitude does not function normally. However, it does not become problematic since it is not necessary for stable tracking lead-in. If the eccentricity storing function is used for another purpose, the amount of eccentricity is measured from the actuator driving voltage in the tracking-on state, and the measured data is stored in the eccentricity storing function for use.

When the amount of eccentricity is large enough to detect the direction, the amount of eccentricity is measured in advance using the eccentricity storing function. Depending on the target track into which the tracking is lead, the tracking is lead into a track at point "a", "b", "c" or "d" shown in FIG. 7. At the points "a" and "c", the tracking is lead into the innermost track and the outermost track, respectively. In either case, the tracking lead-in is done by instructing a tracking-on in the instant that the optical spot is passing the target track (black arrows). When the tracking is lead into the central track, the actuator is operated by a driving force that corresponds to the eccentricity speed read from the eccentricity storing function in the instant that the optical spot is passing the central track at 180 degrees or 360 degrees of rotation angle, so that the optical spot substantially follows the central track (white arrows). The eccentricity speed of the central track is set to be approximately equal to the moving speed of the actuator so that tracking lead-in is done stably well. It is possible to lead the tracking into a vicinity of the central track by instructing a tracking-on at point "b" or "d". To detect the speed, the measurement result of the speed detection unit 108 is used.

As mentioned earlier, the groove crossing speed (moving speed) of the central track crossing the optical spot may exceed the predetermined range of the moving speed of the direction detection unit if the amount of eccentricity is large. Even in this case, however, the amount of eccentricity is stored in the eccentricity storing function normally since the direction is detected in the moving speed that is within the predetermined range before the speed reaches the maximum moving speed. Accordingly, the tracking lead-in is performed in the same manner as those at points "a", "b", "c" and "d" shown in FIG. 7.

Figure 8:
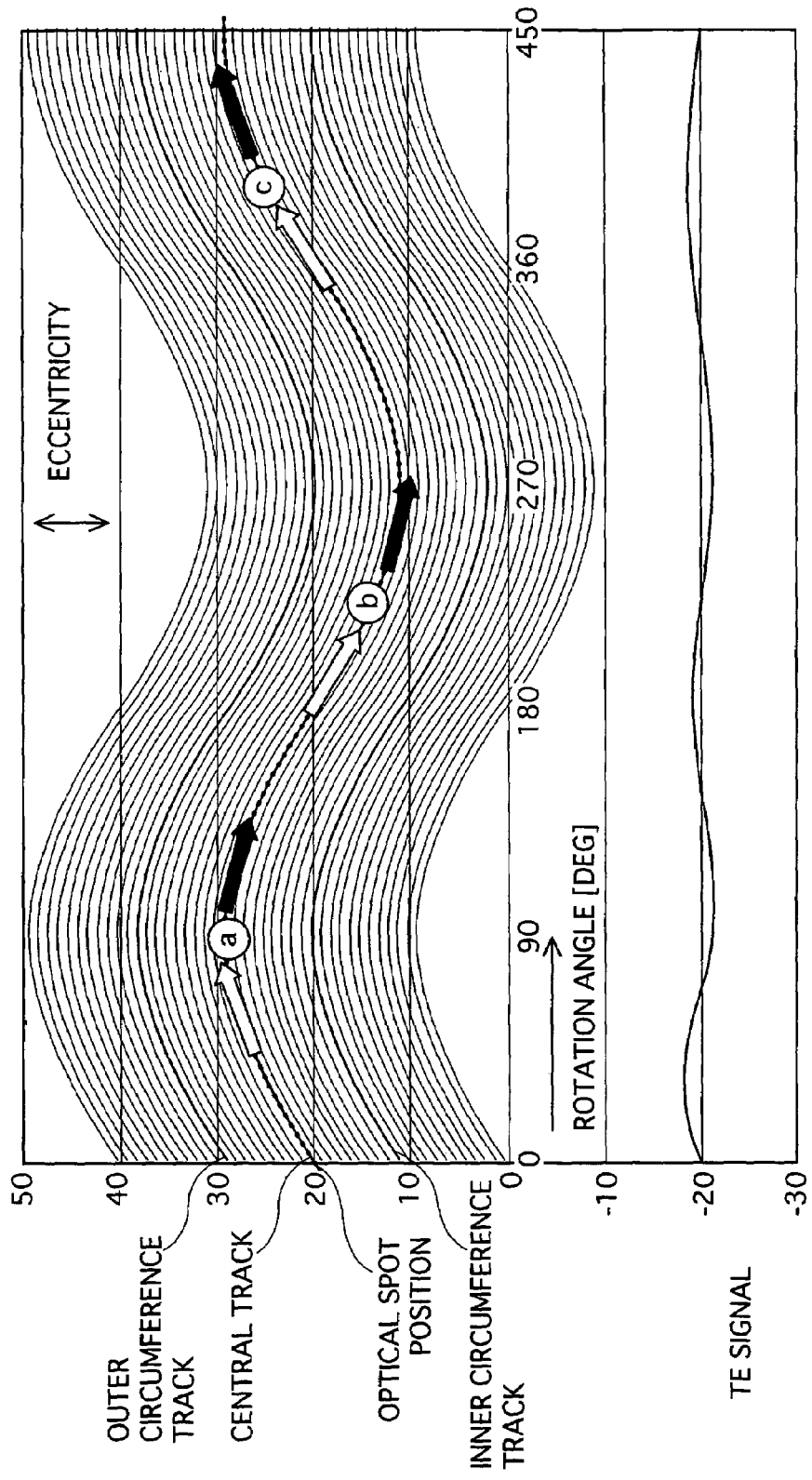
FIG. 8 shows the lead-in process with the eccentricity memory.

FIG. 8 shows another method for leading the tracking into the central track.

In this example, the optical spot is caused to follow the eccentricity by driving the actuator by a driving force that is equivalent to the amount of eccentricity due to the rotation angle of the eccentricity storing function. As a result of this, the optical spot is always in the vicinity of the central track. The TE signal corresponding to this state is shown in the lower row of FIG. 8. In actuality, however, the TE signal is not necessarily close to "0" and a groove cross at a level of several tracks occurs since the tracking has not been lead in. However, this does not affect the tracking lead-in, and it is possible to lead into the target central track by leading the tracking in at any of the points "a", "b" and "c" shown in FIG. 8. The white arrows before these points indicate driving by an open loop, and the black arrows after these points indicate a close loop, namely a tracking-on state.

It should be noted here that even in the tracking-on state, it is possible to decrease the difference between remainders of tracking control calculations when the amount of eccentricity is not shifted to the outer or inner circumference and the rotation angle is constant by allowing the eccentricity storing function to continue the actuator driving by the feed forward. Also, it is possible, by superimposing an appropriate offset signal on the actuator driving signal, to lead the tracking into the inner circumference track, outer circumference track, or a vicinity of a given track while allowing the eccentricity storing function to continue the actuator driving.

Tracking Lead-in Operation at End of Seek

Figure 9:
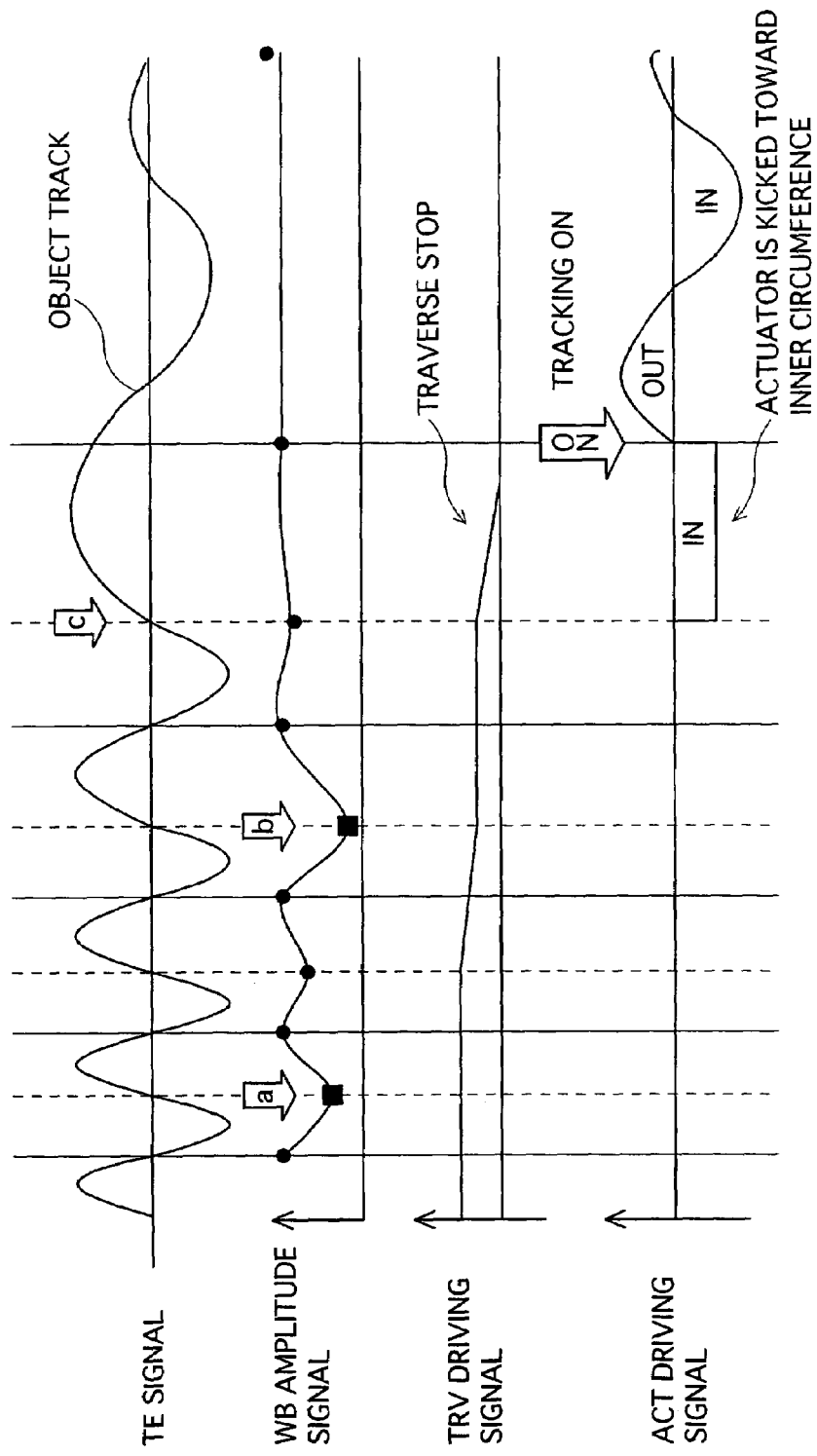
FIG. 9 shows the tracking lead-in operation at an end of a seek.

Up to now, the tracking lead-in operation during activation of the optical disc has been explained. Now, the tracking lead-in operation during a seek will be described with reference to FIG. 9. FIG. 9 shows the tracking lead-in operation at an end of a seek proceeding from the inner circumference to the outer circumference, omitting the speed control performed from the start to the middle of the seek.

This seek operation differs from the lead-in at the activation in that it moves the traverse to transfer the optical head 103 during the seek, and that it leads the tracking into the target track accurately. The operation of leading the tracking into the target track is performed when the number of tracks from the seek start track to the target track matches the number of tracks counted as the number of groove zero-crosses of the TE signal based on the judgment by the polarity judgment unit 109 and corrected by increase and decrease corresponding to variation in the rotation speed. This function is called a groove count function. It is supposed here that this function is embedded in the tracking control unit 111. When the moving speed of the optical spot is slow at the start or end of a seek, the moving direction of the crossing track may be reversed depending on the eccentricity of the optical disc. In this case, it is possible to obtain accurate groove count values through corrections. In the present embodiment, controls are performed so that the eccentricity memory is enabled even during the seek to keep a relative amount of eccentricity at approximately "0", while the moving speed of the optical spot at the start of the seek is kept to be higher than the eccentricity speed to keep the optical spot moving direction to be constant, and the moving speed of the optical spot at the end of the seek is kept to be at such a level that does not reverse the moving direction.

When the number of groove counts becomes less as shown in FIG. 9 and the moving speed is reduced to a predetermined speed or lower, the polarity judgment unit 109 can judge the polarity of the land at points "a" and "b". This enables the direction detection unit 110 to confirm the moving direction based on the results of the polarity judgment unit 109. When it is detected based on the groove count value that the optical spot moving at a constant speed reaches the land point "c" located before the target track, the traverse is stopped by turning off the traverse driving, and a kick pulse, which has been adjusted in terms of the wave height value and width so that the speed is slightly slower than the track moving speed, is added to the actuator in the direction toward the inner circumference. And then, the tracking-on is performed by restricting a relative speed between the optical spot and the target track. This enables the tracking to be lead into the land of the target track stably.

When the eccentricity memory is not mounted or when the moving direction is reversed at the end of a seek, which occurs when the eccentricity memory is inaccurate during the seek because the rotation angle cannot be determined accurately because the CLV control has not reached the number of rotations of the target track, the following control is performed: at the end of the seek, the tracking is temporarily lead into a vicinity of the target track stably by correcting the groove count within a range in which the direction detection unit 110 operates normally. The lead-in may be performed in the same manner as the lead-in during the activation. However, the tracking may be lead into a track other than the target track. Accordingly, after the tracking is lead into a track, a renewed seek of the target track is performed. This seek is stable because it is a short-distance seek at a level of a continuous jump.

Figure 10:
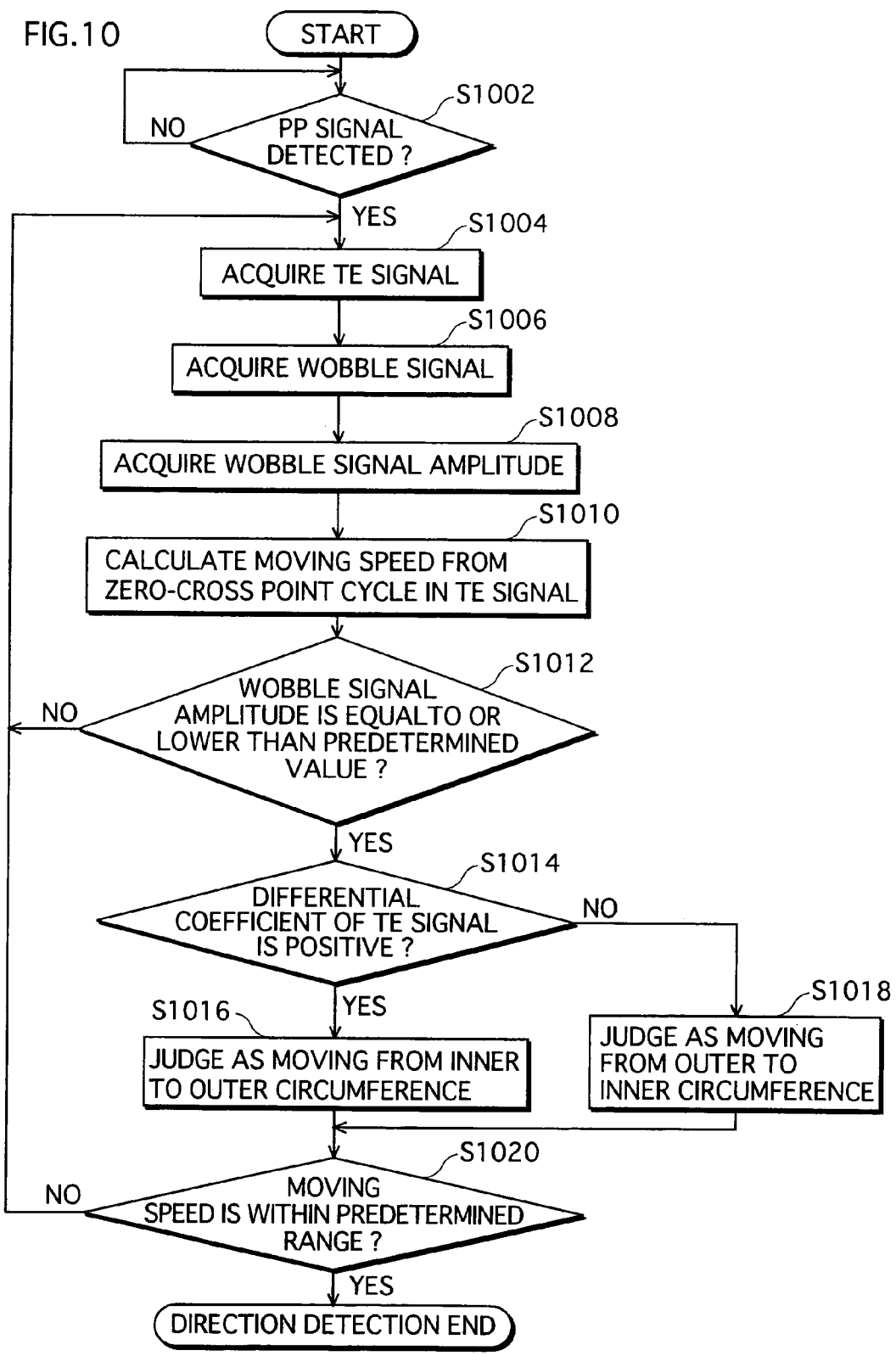
FIG. 10 is a flowchart showing the major operations in the above-mentioned embodiment.

Now, the main operation of the present embodiment will be described with reference to the flowchart shown in FIG. 10.

The optical head 103 waits for the push-pull signal to be detected (S1002), and after the push-pull signal is detected, outputs the push-pull signal to the LPF 104 and the BPF 105.

The LPF 104 removes the wobble signal component from the push-pull signal, and outputs the tracking error signal to the speed detection unit 108, the polarity judgment unit 109, and the tracking control unit 111 (S1004).

The BPF 105 allows the push-pull signal to pass through itself of the wobble signal band, and outputs the wobble signal to the detector 1066 (S1006). The detector 106 extracts the wobble amplitude component, and outputs it to the LPF 107. The LPF 107 removes a local amplitude variation that was caused by a modulation of the address information, and outputs the wobble signal amplitude to the polarity judgment unit 109 and the tracking control unit 111 (S1008).

The speed detection unit 108 measures the cycle of the zero-cross point of the tracking error signal, and obtains a relative moving speed between the optical spot and the track by dividing tracking pitch Tp, which has been notified beforehand, by the measured cycle (S1010). The speed detection unit 108 notifies the calculated moving speed to the direction detection unit 110 and the tracking control unit 111.

The polarity judgment unit 109 waits for the wobble signal amplitude to become a predetermined value (for example, a half of the reference amplitude) (S1012), and after the wobble signal amplitude becomes the predetermined value, judges that the corresponding section around the zero-cross point of the tracking error signal is a land by the tracking polarity judgment.

The polarity judgment unit 109 then calculates a differential coefficient at the zero-cross point of the tracking error signal, and notifies the result to the direction detection unit 110.

The direction detection unit 110, upon receiving the calculation result from the polarity judgment unit 109, judges whether the notified differential coefficient is positive (S1014) If it judges that the notified differential coefficient is positive, the direction detection unit 110 judges that the optical spot is moving in a direction from the inner circumference toward the outer circumference of the optical disc (S1016), and if it judges that the notified differential coefficient is negative, the direction detection unit 110 judges that the optical spot is moving in a direction from the outer circumference toward the inner circumference of the optical disc (S1018).

The tracking control unit 111 then judges whether the moving speed is within a predetermined range (S1020). If the tracking control unit 111 judges that the moving speed is within the predetermined range, the control returns to S1004; and if it judges that the moving speed is without the predetermined range, the direction detection process ends.

Embodiment 2

Figure 11:
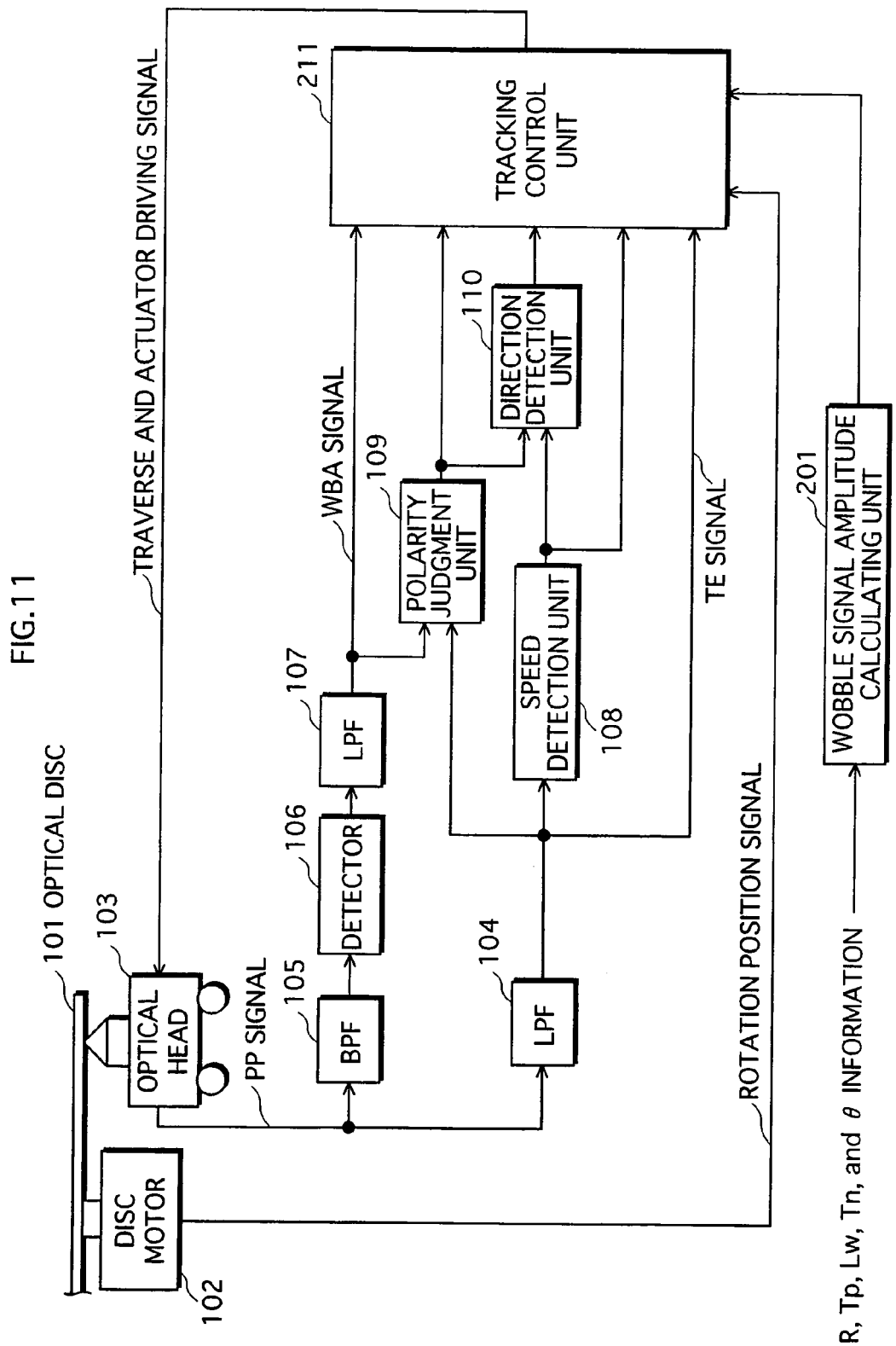
FIG. 11 is a block diagram of Embodiment 2.

FIG. 11 is a block diagram of Embodiment 2 of the present invention. The construction of Embodiment 2 includes the function of Embodiment 1, and additionally includes a function to correct the groove count error during a seek. More specifically, Embodiment 2 additionally includes a wobble signal amplitude calculating unit 201. The wobble signal amplitude calculating unit 201 makes a comparison between a calculated value and a measured value of the amount of wobble amplitude for lands at the end of a seek. Embodiment 2 also includes, instead of the tracking control unit 111, a tracking control unit 211 that additionally has a function to correct the groove count error, which is caused by a defect or the like, prior to the comparison, enabling the target track to be reached more accurately. The following explanation of Embodiment 2 omits the explanation of the construction that has already been described in relation to FIGS. 5 to 9.

Before a specific explanation is provided, the advantageous effect of the present embodiment will be described. The method of including addresses in the wobble groove improves the format efficiency, while the present optical disc allows a smaller number of addresses to be included in one track than conventional optical discs having the sector structure. With an optical disc with a small diameter, such as an optical disc with a radius of slightly more than 10 mm, that uses even the inner circumference, the number of addresses per track is several addresses per rotation in the worst case. This makes an address-lead wait time as long as the rotation wait time. If it is found in the address check at the end of a seek that the reached track is not the target track, the seek must be retried. This address-lead wait time is not negligible. It is accordingly desirable that the target track is reached in one seek even if it is a long-distance seek, to secure a high-speed and stable seek. This is the reason why the present embodiment has the groove count correction function using the wobble signal amplitude.

The wobble signal amplitude calculating unit 201 shown in FIG. 11 can calculate the wobble signal amplitude at a predetermined position of a land on the outer side of a target track, using Equations 3 to 5 by substituting values for R, Tp, Lw, Tn, and θ. In this calculation, the wobble signal amplitude for the rotation angle at which the optical spot crosses a plurality of tracks before reaching the seek-target track. The values for parameters R, Tp, and Lw, which can be acquired by reading the format data and the control data or by a measurement, are input beforehand. The remaining parameters, the track number Tn and the rotation angle θ, are input at the end of the seek. In this way, the wobble signal amplitude is calculated. In the above explanation, R is a radius of a track at the starting point. However, R may be a radius at a reference position where the wobble phase on a predetermined track is 0. In this case, the rotation angle from the reference position is corrected, and a calculation is made after a new track number and a new rotation angle are obtained.

The groove count error correction is performed when a small number of groove counts remains in the seek end process. At the seek end, the moving speed of a track, which is a predetermined number of tracks (for example, 100 tracks) away from the target track, is decreased to such a level that the WBA signal can be measured. Then, starting with the timing when the track is passed, the actual measurement value of the WBA signal for lands and the value calculated using the wobble signal amplitude calculating unit 201 are stored as a measurement data sequence and a calculation data sequence each time a land is passed. Then, when the number of pieces of data, namely the number of crossed lands, exceeds a predetermined value, the calculation data sequence is used as a template to calculate a correlation by shifting the measurement points of the measurement data sequence back and forth by several points, and obtains a "shift length" as an amount of shift of the measurement points that has the highest matching level (pattern-matching). The predetermined number of lands at the start of calculating the shift length and the number of points to be shifted in the correlation calculation are smaller than an approximate cycle (see FIG. 4) of the wobble signal amplitude for lands that is determined from Tp and Lw.

If the groove count is accurate, the shift length is supposed to be "0". If there is a groove count error, the level of the error is indicated by the shift length. After the shift length is calculated, the groove count value is corrected in accordance with the shift length. This correction and the earlier-described tracking lead-in operation during the seek process enable the tracking to be lead into the target track accurately and stably. This terminates the explanation of Embodiment 2.

In the above-described embodiments, the push-pull signal is obtained by the one-beam system. However, a similar signal can be extracted from three beams or the main beam of DPP, for similar use.

It is also possible to extract the TE signal and the WBA signal from the push-pull signal that is extracted from three beams or the side beam of DPP, and detect the moving direction of the optical spot in a similar manner to the above-described embodiments. In this case, however, it is required to control the tracking lead-in by taking the main beam position into consideration.

Also, in the above-described embodiments, the result of the direction detection is used in the activation and in the tracking lead-in at the end of a seek. However, the result of the direction detection is used in various occasions. The result of the direction detection is used, for example, (i) when a re-acceleration is required due to a more-than-expected reduction in speed at the end of a seek, or (ii) during a seek by a multi-track jump. Even if the result of the direction detection becomes unreliable when the speed becomes lower than a predetermined value, the direction detection can be performed correctly after the moving speed is restored to a predetermined range. This provides a smooth seek operation.

The present invention is described as a tracking control apparatus in the embodiments. The present invention however can be achieved as a tracking control method. This is because after the push-pull signal is converted from analog to digital, the signal can be processed in a similar manner by software using DSP, which is a main stream in the servo control in the existing optical disc apparatuses.

The block diagrams of the embodiments are shown in FIGS. 5 and 11. respectively. However, it is possible to write a program for causing a computer to achieve the functions of the components as shown in these figures, and apply the program for achievement of the tracking control apparatus.

Also, the components are not limited to the forms shown in the embodiments, but include all forms that generate the same advantageous effects of the embodiments.

INDUSTRIAL APPLICABILITY

The optical disc tracking control apparatus of the present invention can be used for an optical disc drive apparatus, and in particular, can be used for an optical disc drive apparatus that can deal with an optical disc on which a wobble signal having a predetermined length is formed for the sake of CLV control.

The invention claimed is:
1. A tracking control apparatus for an optical disc which has wobble grooves as tracks, comprising:
a signal detection unit including
an optical head to transmit a push-pull signal from an optical spot focused on the optical disc,
a low pass filter connected to the optical head, the low-pass filter receiving the push-pull signal, removing a wobble signal from the push-pull signal, and outputting a tracking error signal, and
a band-pass filter of a wobble signal band connected to the optical head, the band-pass filter receiving the push-pull signal and allowing the wobble signal from the push-pull signal to pass through;
a speed calculation unit calculating, in a tracking-off state, a relative moving speed between the optical spot and the tracks, from (i) a zero-cross point cycle in the tracking error signal and (ii) a track pitch;
a polarity judgment unit judging, by a polarity judgment, that the optical spot is on a land if a wobble signal amplitude value is equal to or lower than a predetermined value in vicinity of a zero-cross point;
a moving direction judgment unit, when the relative moving speed is within a predetermined range and the polarity judgment unit has judged that the optical spot is on a land, judging a moving direction of the optical spot relative to the tracks, from a rise/decay direction of the tracking error signal;
a control unit performing a tracking lead-in by reducing the relative moving speed, based on the relative moving speed calculated by the speed calculation unit and the moving direction, and
the moving direction judgment unit judges whether the optical spot is moving from an inner circumference track toward an outer circumference track or from the outer circumference track toward the inner circumference track, according to whether a differential coefficient of the tracking error signal is positive or negative, wherein the polarity judgment unit includes at least one of:
a first judgment sub-unit judging that the optical spot is on a groove if a RF signal amplitude value from the optical disc is equal to or higher than a predetermined value;
a second judgment sub-unit judging whether the optical spot is on a groove or a land based on total light quantity signals from the groove and the land of the optical disc if there is a difference between the total light quantity signals; and
a third judgment sub-unit judging whether the optical spot is on a groove or a land based on total light quantity signals from the groove and the land of the optical disc if there is a difference between the total light quantity signals, excluding portions of the optical disc for which the RF signal amplitude value from the optical disc is equal to or higher than the predetermined value, wherein
the moving direction judgment unit further judges the moving direction of the optical spot relative to the tracks from the rise/decay direction of the tracking error signal if any of the first to third judgment sub-units judges by a polarity judgment whether the optical spot is on a groove or a land.
2. The tracking control apparatus of claim 1, wherein the control unit includes:
an eccentricity storing sub-unit calculating an amount of eccentricity per rotation of the optical disc, from a moving speed and a moving direction that are calculated and judged by the speed calculation unit and the moving direction judgment unit based on the tracking error signal corresponding to one-half or more rotation of the optical disc, and to store data of the calculated amount of eccentricity;

a following operation sub-unit causing the optical spot to follow a specific track among a plurality of eccentricity tracks crossing the optical spot, with timing when the specific track passes the optical spot, based on the amount of eccentricity stored in the eccentricity storing sub-unit; and a first lead-in sub-unit leading a tracking into the specific track or a track in vicinity of the specific track while the optical spot is following the specific track.

3. The tracking control apparatus of claim 2, wherein the specific track is approximately at a center of the plurality of eccentricity tracks.

4. The tracking control apparatus of claim 1, wherein the control unit includes:

an eccentricity storing sub-unit calculating an amount of eccentricity per rotation of the optical disc, from a moving speed and a moving direction that are calculated and judged by the speed calculation unit and the moving direction judgment unit based on the tracking error signal corresponding to one-half or more rotation of the optical disc, and to store data of the calculated amount of eccentricity;

a second following operation sub-unit causing the optical spot to follow a track that is approximately at a center of the plurality of eccentricity tracks, based on the amount of eccentricity stored in the eccentricity storing sub-unit; and a second lead-in sub-unit, with given timing, leading a tracking into the track approximately at the center of the plurality of eccentricity tracks.

5. The tracking control apparatus of claim 1, wherein the control unit includes:

an amplitude calculation sub-unit calculating a wobble signal amplitude of a land that is adjacent to a given point on a track of the optical disc, using a reference radius position of a wobble phase, a track pitch, a wobble length, a track number, and a rotation angle;

an amplitude storing sub-unit storing, as a measurement data sequence of wobble signal amplitude, moving directions that are judged by the moving direction judgment unit prior to a tracking lead-in at an end of a seek by restricting a moving speed of the optical spot to within the predetermined range; and an error correction sub-unit correcting an error of a groove count value in a middle of a seek of an object track, according to a correlation between (i) a data sequence of wobble signal amplitude values for a plurality of lands crossed by the optical spot that are calculated by the amplitude calculation sub-unit from groove count values counted during the seek of the object track and (ii) the measurement data sequence, using the calculated wobble signal amplitude value data sequence as a template.

6. The tracking control apparatus of claim 1, wherein the polarity judgment unit includes a first judgment sub-unit judging that the optical spot is on a groove if a RF signal amplitude value from the optical disc is equal to or higher than a predetermined value at a zero-cross point in the TE signal.

7. The tracking control apparatus of claim 1, wherein the signal detection unit further includes
a detector connected to the band-pass filter to obtain an amplitude component from the wobble signal.

8. The tracking control apparatus of claim 7, wherein the signal detection unit further includes
a low-pass filter connected to the detector to remove a partial amplitude variation from the amplitude component and output the wobble signal amplitude value.

9. A tracking control method for an optical disc which has wobble grooves as tracks, comprising the steps of:

transmitting a push-pull signal from an optical spot focused on the optical disc;

detecting a tracking error signal using a low-pass filter to filter a push-pull signal and remove a wobble signal from the push-pull signal;

detecting a wobble signal using a band-pass filter of a wobble signal band to filter the push-pull signal and allowing the wobble signal from the push-pull signal to pass through;

calculating, in a tracking-off state, a relative moving speed between the optical spot and the tracks, from a zero-cross point cycle in the tracking error signal;

judging, by a polarity judgment, that the optical spot is on a land or a groove if a wobble signal amplitude value is equal to or lower than a predetermined value in vicinity of a zero-cross point by using a judgment step selected from one of the following;

(a) judging that the optical spot is on a groove if a RF signal amplitude value from the optical disc is equal to or higher than a predetermined value (b) judging whether the optical spot is on a groove or a land based on total light quantity signals from the groove and the land of the optical disc if there is a difference between the total light quantity signals; and (c) judging whether the optical spot is on a groove or a land based on total light quantity signals from the groove and the land of the optical disc if there is a difference between the total light quantity signals, excluding portions of the optical disc for which the RF signal amplitude value from the optical disc is equal to or higher than the predetermined value; and judging a moving direction of the optical spot relative to the tracks from a rise/decay direction of the tracking error signal when the relative moving speed is within a predetermined range and it has been judged that the optical spot is on a groove or land.

10. A computer readable medium, encoded with a tracking control program for causing a computer to perform a tracking control of an optical disc which has wobble grooves as tracks, which when executed by a processor, causes the processor to perform the steps of:

transmitting a push-pull signal from an optical spot focused on the optical disc;

detecting a tracking error signal using a low-pass filter to filter a push-pull signal and remove a wobble signal from the push-pull signal;

detecting a wobble signal using a band-pass filter of a wobble signal band to filter the push-pull signal and allowing the wobble signal from the push-pull signal to pass through;

calculating, in a tracking-off state, a relative moving speed between the optical spot and the tracks, from (i) a zero-cross point cycle in the tracking error signal and (ii) a track pitch;

judging, by a polarity judgment, that the optical spot is on a land or a groove if a wobble signal amplitude value is equal to or lower than a predetermined value in vicinity of a zero-cross point by using a judgment step selected from one of the following:

(a) judging that the optical spot is on a groove if a RF signal amplitude value from the optical disc is equal to or higher than a predetermined value (b) judging whether the optical spot is on a groove or a land based on total light quantity signals from the groove and the land of the optical disc if there is a difference between the total light quantity signals; and (c) judging whether the optical spot is on a groove or a land based on total light quantity signals from the groove and the land of the optical disc if there is a difference between the total light quantity signals, excluding portions of the optical disc for which the RF signal amplitude value from the optical disc is equal to or higher than the predetermined value; and judging a moving direction of the optical spot relative to the tracks from a rise/decay direction of the tracking error signal when the relative moving speed is within a predetermined range and it has been judged that the optical spot is on a groove or land.

* * * * *